(12) United States Patent
Oh et al.

(10) Patent No.: US 11,173,769 B2
(45) Date of Patent: Nov. 16, 2021

(54) THERMAL MANAGEMENT SYSTEM FOR VEHICLE

(71) Applicants: Hyundai Motor Company, Seoul (KR); Kia Motors Corporation, Seoul (KR); Hanon Systems, Daejeon (KR)

(72) Inventors: Man Ju Oh, Yongin-Si (KR); Sang Shin Lee, Suwon-Si (KR); Jae Woong Kim, Hwaseong-Si (KR); So La Chung, Seoul (KR); Yun Sub Chung, Daejeon (KR); Gum Bae Choi, Daejeon (KR)

(73) Assignees: Hyundai Motor Company, Seoul (KR); Kia Motors Corporation, Seoul (KR); Hanon Systems, Daejeon (KR)

( * ) Notice: Subject to any disclaimer, the term of this patent is extended or adjusted under 35 U.S.C. 154(b) by 111 days.

(21) Appl. No.: 16/653,432

(22) Filed: Oct. 15, 2019

(65) Prior Publication Data

US 2020/0353796 A1   Nov. 12, 2020

(30) Foreign Application Priority Data

May 9, 2019 (KR) .......................... 10-2019-0054142

(51) Int. Cl.
  *B60H 1/32*  (2006.01)
  *B60H 1/00*  (2006.01)
(52) U.S. Cl.
  CPC ....... *B60H 1/3228* (2019.05); *B60H 1/00278* (2013.01); *B60H 1/00485* (2013.01)

(58) Field of Classification Search
  CPC .............. B60H 1/3228; B60H 1/00278; B60H 1/00485; B60L 58/26
  See application file for complete search history.

(56) References Cited

U.S. PATENT DOCUMENTS

| | | | |
|---|---|---|---|
| 5,549,153 A | 8/1996 | Baruschke et al. | |
| 8,215,432 B2 | 7/2012 | Nemesh et al. | |
| 8,336,319 B2 | 12/2012 | Johnston et al. | |
| 8,402,776 B2 | 3/2013 | Johnston et al. | |
| 2013/0284415 A1 | 10/2013 | Katoh | |
| 2014/0041826 A1 | 2/2014 | Takeuchi et al. | |
| 2015/0258875 A1 | 9/2015 | Enomoto et al. | |
| 2016/0107506 A1 | 4/2016 | Johnston | |
| 2016/0339767 A1 | 11/2016 | Enomoto et al. | |
| 2019/0168578 A1* | 6/2019 | Kim | B60H 1/323 |
| 2019/0176571 A1* | 6/2019 | Oh | B60H 1/00899 |
| 2019/0308491 A1* | 10/2019 | Lee | B60H 1/00278 |
| 2020/0346523 A1* | 11/2020 | Oh | B60H 1/00278 |
| 2020/0353796 A1 | 11/2020 | Oh | |

(Continued)

FOREIGN PATENT DOCUMENTS

| | | |
|---|---|---|
| DE | 102007063251 A1 | 7/2009 |
| DE | 102012010697 A1 | 12/2013 |
| DE | 102014111971 A1 | 2/2016 |

(Continued)

*Primary Examiner* — Marc E Norman
(74) *Attorney, Agent, or Firm* — Morgan, Lewis & Bockius LLP

(57) ABSTRACT

A thermal management system for a vehicle, is configured for efficiently managing the energy necessary for the indoor air-conditioning, the cooling of an electric part, or the cooling and heating of a battery in the field of the thermal management for a vehicle.

17 Claims, 12 Drawing Sheets

(56) References Cited

U.S. PATENT DOCUMENTS

2020/0398636 A1   12/2020   He et al.

FOREIGN PATENT DOCUMENTS

| | | |
|---|---|---|
| DE | 112014005360 T5 | 8/2016 |
| JP | 2019-031109 A | 2/2019 |
| KR | 10-1448656 B1 | 10/2014 |
| KR | 10-1787503 B1 | 10/2017 |
| KR | 10-2018-0093184 A | 8/2018 |
| KR | 10-2019-0033115 A | 3/2019 |
| KR | 10-2019-0127219 A | 11/2019 |

\* cited by examiner

THERMAL MANAGEMENT SYSTEM FOR VEHICLE

CROSS REFERENCE TO RELATED APPLICATION

The present application claims priority to Korean Patent Application No. 10-2019-0054142 filed on May 9, 2019, the entire contents of which is incorporated herein for all purposes by this reference.

BACKGROUND OF THE DISCLOSURE

Field of the Disclosure

The present invention relates to a thermal management system for a vehicle, which efficiently manages the energy necessary for indoor air-conditioning, cooling of an electric part or cooling/heating of a battery in the field of the thermal management for a vehicle.

Description of Related Art

Recently, electric vehicles are becoming a social issue to solve problems such as the implementation of eco-friendly technologies and energy depletion. The electric vehicle operates by use of a motor configured for receiving electricity from a battery to output power. Therefore, there is no emission of carbon dioxide, noise is very small, and the energy efficiency of the motor is higher than the energy efficiency of the engine, becoming popular as the eco-friendly vehicle.

The key technology for implementing such an electric vehicle is the technology relating to a battery module, and recently, researches on the light weight, miniaturization, and short charge time, etc. of the battery are actively conducted. The battery module can keep optimum performance and long lifespan only when used in an optimum temperature environment. However, it is difficult to use in the optimum temperature environment due to the heat generated while driving and a change in the outside temperature.

In addition, since the electric vehicle does not have a waste heat source generated when the engine is burned in a separate engine such as an internal combustion engine, the electric vehicle performs heating of a vehicle indoor in winter with an electric heating device and it is also necessary to warm up the vehicle in cold weather to enhance the charge and discharge performance of the battery, such that the electric vehicle uses by forming a separate coolant heating type electric heater, respectively. That is, to keep the optimum temperature environments of the battery module, a technology of operating a cooling and heating system for temperature adjustment of the battery module separately from the cooling and heating system for vehicle indoor air-conditioning is adopted. That is, two independent cooling and heating systems are configured, and one is used for indoor cooling and heating, and the other is used for temperature adjustment of the battery module.

However, when operating in the method as described above, energy cannot be efficiently managed, such that it is impossible to operate long distance due to a short cruising range, and the travel distance is reduced by 30% in summer cooling and 40% in winter heating, further becoming serious a problem of the winter heating, which has not happened yet in the internal combustion engine. There occurs a problem in that when a high capacity PTC is provided to solve the problem occurred in the winter heating, the cost and weight due to the shortening of the travel distance and the use of a heat pump become excessive.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a thermal management system for a vehicle, which efficiently manages the energy necessary for indoor air-conditioning, cooling of an electric part or cooling and heating of a battery in the field of the thermal management for a vehicle.

A thermal management system for a vehicle according to an exemplary embodiment of the present invention for achieving the object may include a battery line of being connected to a battery core so that a first radiator and the battery core are heat-exchanged therebetween, and through which coolant flows; a refrigerant line of connecting a compressor, an expansion valve, a condenser, and an evaporator; an indoor cooling line of being connected to a cooling core so that the cooling core for indoor air-conditioning is heat-exchanged with the evaporator through a first heat exchanger, and through which the coolant flows; an indoor heating line of being connected to a heating core so that the heating core for indoor air-conditioning is heat-exchanged with the condenser through a second heat exchanger, and through which the coolant flows; an electric part line of being connected to an electric part core so that a second radiator and the electric part core are heat-exchanged therebetween, and through which the coolant flows; a third radiator line connected to a third radiator, having one end portion connected to the upstream point of the second heat exchanger in the indoor heating line through a first valve, and having the other end portion connected to the downstream point of the second heat exchanger in the indoor heating line through a fourth valve; a first bypass line having one end portion connected to the upstream point of the first heat exchanger in the indoor cooling line through a second valve, and having the other end portion connected to the downstream point of the electric part core in the electric part line through a third valve; a first inflow line branched at the upstream point of the first radiator in the battery line and connected to the indoor cooling line and the first bypass line through the second valve and a second inflow line branched at the same point as the first inflow line in the battery line and connected to the indoor heating line and the third radiator line through the fourth valve; and a control unit for controlling the operations of the compressor and the plurality of valves.

The thermal management system for the vehicle can further include a first battery cooling line provided with a cooling adjusting valve branched at the downstream point of the cooling core in the indoor cooling line to be connected to the upstream point of the battery core in the battery line, and for adjusting whether the coolant having passed through the cooling core flows into the battery core; and a first battery heating line provided with a heating adjusting valve branched at the upstream point of the heating core in the indoor heating line to be connected to the upstream point of the battery core in the battery line, and for adjusting whether the coolant having passed through the battery core flows into the heating core.

The thermal management system for the vehicle can further include a first branch line branched at the upstream point of the first radiator in the battery line, and connected to the upstream point of the second radiator in the electric part line; and a second branch line branched at the same point as the first branch line in the battery line, and connected to the upstream point of the third radiator in the third radiator line in the electric part line, and the first branch line and the second branch line may be connected to the battery line through a fifth valve.

The thermal management system for the vehicle can further include a third branch line branched at the downstream point of the first radiator in the battery line, and connected to the downstream point of the second radiator in the electric part line; and a fourth branch line branched at the same point as the third branch line in the battery line, and connected to the downstream point of the third radiator in the third radiator line, and the third branch line and the fourth branch line may be connected to the battery line through a sixth valve.

In a first mode that cools the battery core and discharges the cooled air into an indoor space of a vehicle, the control unit can operate the compressor to circulate the refrigerant in a refrigerant line, control the first valve, the fourth valve, the fifth valve, and the sixth valve to circulate the coolant so that the second heat exchanger connected to the condenser is selectively heat-exchanged with the first radiator, the second radiator, and the third radiator, and control the cooling adjusting valve and the second valve to circulate the coolant so that the coolant having passed through the cooling core connected to the evaporator first cools the indoor by passing through the cooling core, flows into the battery core, and then is recovered back to the first heat exchanger.

In a second mode that discharges the cooled air into an indoor space of a vehicle, the control unit can operate the compressor to circulate the refrigerant in a refrigerant line, control the first valve, the fourth valve, the fifth valve, and the sixth valve to circulate the coolant so that the second heat exchanger connected to the condenser is heat-exchanged with the first radiator, the second radiator, and the third radiator, and control the cooling adjusting valve and the second valve to circulate the coolant so that the coolant having passed through the first heat exchanger connected to the evaporator passes through the cooling core and then is recovered back to the first heat exchanger.

In a third mode that cools the battery core and the electric part core by use of the outside air of a vehicle and discharges the cooled air into an indoor space of the vehicle, the control unit can operate the compressor to circulate the refrigerant in the refrigerant line, control the fifth valve and the sixth valve so that the coolant does not circulate in the first and second branch lines and the third and fourth branch lines and to circulate the coolant so that the battery core and the first radiator are heat-exchanged therebetween, control the third valve to circulate the coolant so that the electric part core is heat-exchanged with the second radiator, control the first valve and the fourth valve to circulate the coolant so that the second heat exchanger connected to the condenser is heat-exchanged with the third radiator, and control the cooling adjusting valve and the second valve to circulate the coolant so that the coolant having passed through the first heat exchanger connected to the evaporator passes through the cooling core and then is recovered back to the first heat exchanger.

In a fourth mode that cools the electric part core by use of the outside air of a vehicle, cools the battery core by use of the refrigerant line, and discharges the cooled air into an indoor space of the vehicle, the control unit can operate the compressor to circulate the refrigerant in the refrigerant line, control the fifth valve and the sixth valve so that the coolant does not circulate in the first and second branch lines and the third and fourth branch lines and control the third valve to circulate the coolant so that the electric part core is heat-exchanged with the second radiator, control the first valve and the fourth valve to circulate the coolant so that the second heat exchanger connected to the condenser is heat-exchanged with the third radiator, and control the cooling adjusting valve and the second valve to circulate the coolant so that the coolant having passed through the first heat exchanger connected to the evaporator passes through the cooling core, first cools the indoor, flow into the battery core, and then is recovered back to the first heat exchanger.

The thermal management system for the vehicle can further include a second bypass line having one end portion connected to the downstream point of the first heat exchanger in the indoor cooling line through a seventh valve, and having the other end portion connected to the upstream point of the electric part core in the electric part line; and a third bypass line having one end portion connected to the downstream point of the second radiator in the electric part line through an eighth valve, and having the other end portion connected to the upstream point of the second radiator in the electric part line.

In a fifth mode that cools the battery core and the electric part core and discharges the heated air into an indoor space of a vehicle, the control unit can operate the compressor to circulate the refrigerant in the refrigerant line, control the fifth valve and the sixth valve so that the coolant does not circulate in the first and second branch lines and the third and fourth branch lines, control the third valve and the eighth valve to circulate the coolant so that the coolant having passed through the electric part core is branched to flow into the first bypass line and the second radiator, control the cooling adjusting valve, the second valve, and the seventh valve to circulate the coolant so that the coolant having passed through the first heat exchanger connected to the evaporator is branched to flow into the second bypass line and the cooling core and to circulate the coolant so that the battery core is heat-exchanged with the first radiator, and control the heating adjusting valve, the first valve, and the fourth valve to circulate the coolant so that the coolant having passed through the second heat exchanger connected to the condenser passes through the heating core and then is recovered back to the second heat exchanger.

The thermal management system for the vehicle can further include a fourth bypass line having one end portion connected to a point between the third branch line and the eighth valve in the electric part line, and having the other end portion connected to the third valve.

In a sixth mode that heats the battery core and discharges the heated air into an indoor space of a vehicle, the control unit can operate the compressor to circulate the refrigerant in the refrigerant line, control the second valve, the third valve, the fifth valve, the sixth valve, the seventh valve, and the eighth valve to circulate the coolant so that the first heat exchanger connected to the evaporator is selectively heat-exchanged with the first, second, and third radiators, and control the heating adjusting valve, the first valve, and the second valve to circulate the coolant so that the coolant having passed through the second heat exchanger connected to the condenser is branched to flow into the heating adjusting valve and the battery core and to circulate the coolant so that the coolant having passed through the battery core flows into the heating adjusting valve and then flows into the heating core.

In a seventh mode that discharges the dehumidified air into an indoor space of a vehicle, the control unit can operate the compressor to circulate the refrigerant in the refrigerant line, control the heating adjusting valve, the first valve, and the fourth valve to circulate the coolant so that the coolant having passed through the second heat exchanger flows into the heating core, and control the cooling adjusting valve, the second valve, and the seventh valve to circulate the coolant so that the coolant having passed through the first heat exchanger flows into the cooling core.

In an eighth mode that cools the electric part core, heats the battery core, and discharges the heated air into an indoor space of a vehicle, the control unit can operate the compressor to circulate the refrigerant in the refrigerant line, control the second valve, the third valve, the fifth valve, the sixth valve, the seventh valve, and the eighth valve to circulate the coolant so that the first heat exchanger and the electric part core are heat-exchanged with the first radiator, the second radiator, and the third radiator, and control the heating adjusting valve, the first valve, and the second valve to circulate the coolant so that the coolant having passed through the second heat exchanger is branched to flow into the heating adjusting valve and the battery core and to circulate the coolant so that the coolant having passed through the battery core flows into the heating adjusting valve and then flows into the heating core.

In a ninth mode that cools the electric part core by use of the outside air of a vehicle, the control unit can control the third valve and the eighth valve to circulate the coolant so that the electric part core is heat-exchanged with the second radiator.

In a tenth mode that cools the battery core by use of the outside air of a vehicle, the control unit can control the fifth valve and the sixth valve to circulate the coolant so that the battery core is heat-exchanged with the first radiator.

In an eleventh mode that cools the electric part core and the battery core by use of the outside air of a vehicle, the control unit can control the third valve and the eighth valve to circulate the coolant so that the electric part core is heat-exchanged with the second radiator, and control the fifth valve and the sixth valve to circulate the coolant so that the battery core is heat-exchanged with the first radiator.

According to the thermal management system for the vehicle of the present invention, it is possible to efficiently manage the energy necessary for indoor air-conditioning, cooling of the electric part, or cooling and heating of the battery in the field of the thermal management for the vehicle.

It is possible to use by dividing or integrating the plurality of radiators effectively, maximizing the cooling and heating efficiency, and to integrate the thermal management system, remarkably reducing the amount of the refrigerant used.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and other advantages of the present invention

Figure 1:
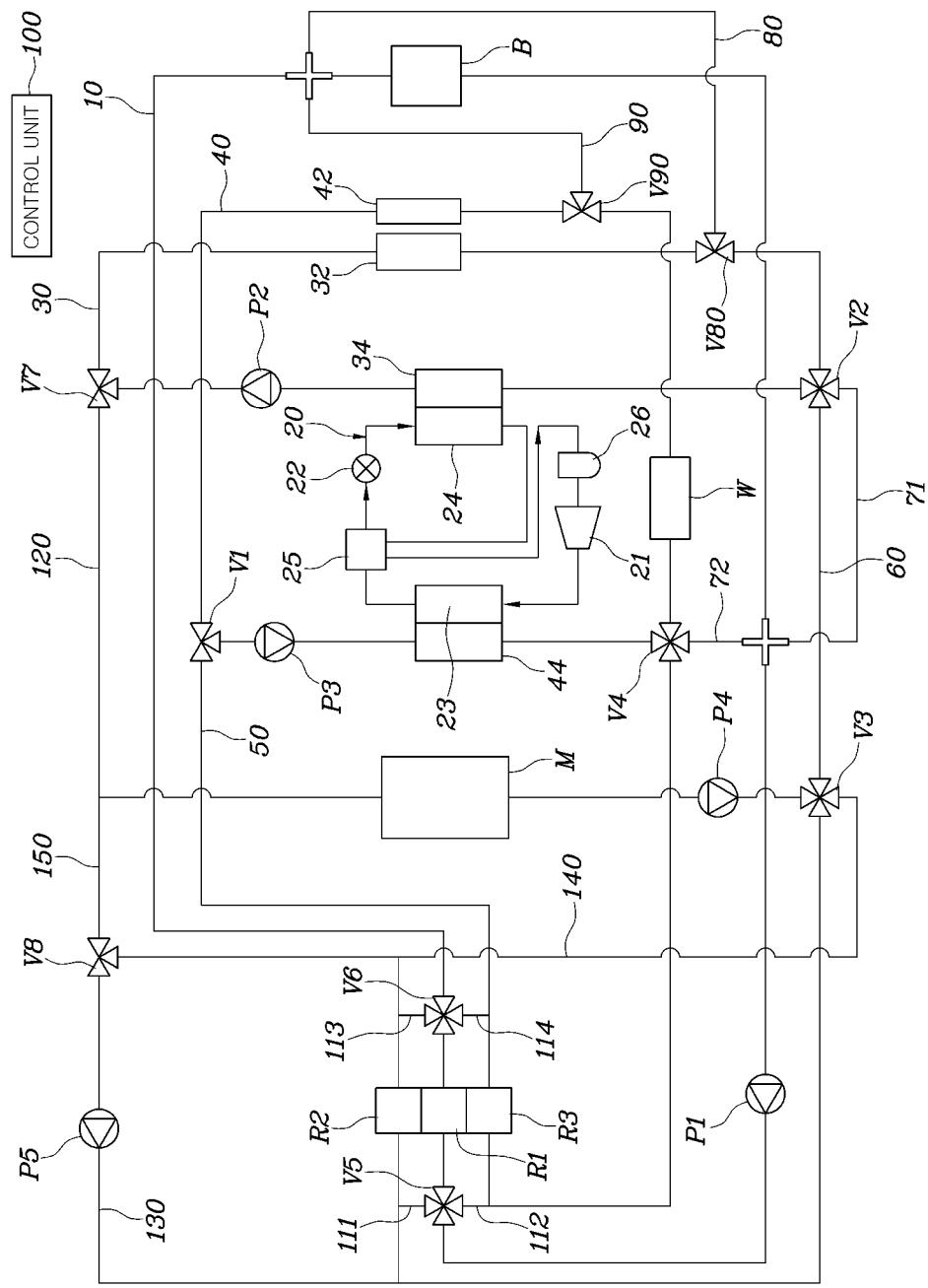
FIG. 1 is a diagram showing a thermal management system for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION OF THE DISCLOSURE

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

FIG. 1 is a diagram showing a thermal management system for a vehicle according to an exemplary embodiment of the present invention, and FIG. 2, FIG. 3 FIG. 4, FIG. 5, FIG. 6, FIG. 7, FIG. 8, FIG. 9, FIG. 10, FIG. 11, and FIG. 12 are diagrams showing each mode of the thermal management system for the vehicle according to an exemplary embodiment of the present invention.

The present invention is provided with a control unit 100. The control unit 100 according to an exemplary embodiment of the present invention may be implemented through a nonvolatile memory configured to store data relating to an algorithm configured to control the operations of various components of the vehicle or a software instruction to play the algorithm and a processor configured to perform the operation described below by use of data stored in the corresponding memory. Herein, the memory and the processor may be implemented as separate chips. Alternatively, the memory and the processor may be implemented as a single chip integrated with each other. The processor can take the form of one or more processors.

Accordingly, the control unit 100 controls the operations of a first pump P1, a second pump P2, a third pump P3, a fourth pump P4, and a fifth pump P5, and adjusts the flow of coolant on the coolant lines on which the respective pumps have been mounted. Accordingly, the control unit 100 controls the operation of a compressor 21 of a refrigerant line 20 to adjust the flow of the refrigerant on the refrigerant line 20. A first valve V1, a second valve V2, a third valve V3, a fourth valve V4, a fifth valve V5, a sixth valve V6, a seventh valve V7, an eight valve V8, a cooling adjusting valve V80, and a heating adjusting valve V90 are respectively controlled by the control unit 100 to selectively connect the coolant lines connected to the respective valves or to control the flow rate. Accordingly, each valve is prepared as a multi-way valve.

As in FIG. 1, a thermal management system for a vehicle according to an exemplary embodiment of the present invention includes a battery line 10 for connecting so that a first radiator R1 and a high-voltage battery core B are heat-exchanged therebetween, and through which coolant flows; the refrigerant line 20 having the compressor 21, an expansion valve 22, a condenser 23, and an evaporator 24; an indoor cooling line 30 for connecting so that a cooling core for 32 indoor air-conditioning is heat-exchanged with the evaporator 24 through a first heat exchanger 34, and through which the coolant flows; an indoor heating line 40 for connecting so that a heating core 42 for indoor air-conditioning is heat-exchanged with the condenser 23 through a second heat exchanger 44, and through which the coolant flows; an electric part line 150 for connecting so that a second radiator R2 and an electric part core M are heat-exchanged therebetween, and through which the coolant flows; a third radiator line 50 connected to a third radiator R3, having one end portion connected to the upstream point of the second heat exchanger 44 in the indoor heating line 40 through the first valve V1, and having the other end portion connected to the downstream point of the second heat exchanger 44 in the indoor heating line 40 through the fourth valve V4; a first bypass line 60 having one end portion connected to the upstream point of the first heat exchanger 34 in the indoor cooling line 30 through the second valve V2, and having the other end portion connected to the downstream point of the electric part core M in the electric part line 150 through the third valve V3; a first inflow line 71 branched at the upstream point of the first radiator R1 in the battery line 10 and connected to the indoor cooling line 30 and the first bypass line 60 through the second valve V2; a second inflow line 72 branched at the same point as the first inflow line 71 in the battery line 10 and connected to the indoor heating line 40 and the third radiator line 50 through the fourth valve V4; and the control unit 100 for controlling the operations of the compressor 21 and the plurality of valves.

The battery line 10 is provided with the high-voltage battery core B, and provided with the first radiator R1 for cooling the high-voltage battery core B by use of the outside air. Accordingly, on the battery line 10, the first pump P1 whose driving and stopping are controlled by the control unit 100 and for circulating coolant is provided. The high-voltage battery core B is a concept that may be a heat-dissipating unit directly connected to a high-voltage battery, and that all includes a heat-dissipating unit indirectly connected to the high-voltage battery through a separate coolant line.

Accordingly, the refrigerant is circulated and connected thermally with other coolant lines in the refrigerant line 20 including the compressor 21, the expansion valve 22, the condenser 23, and a heat-dissipater. The compressor 21 is driven by the control unit 100, the refrigerant circulates through the compressor 21, the condenser 23, the expansion valve 22, and the evaporator 24, and the evaporator 24 and the condenser 23 heat-exchanges with the coolant lines through the first heat exchanger 34 and the second heat exchanger 44, respectively. Through this structure, the refrigerant line 20 may be configured to be very compact to reduce the amount of refrigerant used, and indirectly cooperates for the necessary point through the coolant, forming an eco-friendly system. Accordingly, an IHX 25 may be prepared in the refrigerant line 20 so that the refrigerant before flowing into the expansion valve 22 and the refrigerant after having passed through the evaporator 24 are heat-exchanged, absorbing more heat in the evaporator 24 as well. Accordingly, the refrigerant line 20 can also be provided with an accumulator 26 together. The accumulator 26 is a device configured for temporarily storing the refrigerant because it damages the compressor when the refrigerant reversely flows or is drawn in with the liquid.

The refrigerant line 20 is thermally connected to the indoor cooling line 30 and the indoor heating line 40. The indoor cooling line 30 is provided with the second pump P2 whose driving and stopping are controlled by the cooling core for 32 indoor air-conditioning and the control unit 100 and for circulating the coolant. Accordingly, the indoor cooling line 30 is provided with the first heat exchanger 34 to be heat-exchanged with the evaporator 24 of the refrigerant line 20 so that the indoor cooling line 30 and the refrigerant line 20 are thermally connected to each other. In addition, the air passing through the cooling core for 32 indoor air-conditioning may be cooled, discharging the cooled air into the indoor space of the vehicle.

The indoor heating line 40 is provided with the third pump P3 whose driving and stopping are controlled by the heating core 42 for indoor air-conditioning and the control unit 100 and for circulating the coolant. Accordingly, the indoor heating line 40 is provided with the second heat exchanger 44 to be heat-exchanged with the condenser 23 of the refrigerant line 20 so that the indoor heating line 40 and the refrigerant line 20 are thermally connected to each other. In addition, the air passing through the heating core 42 for indoor air-conditioning may be heated, discharging the heated air into the indoor space of the vehicle.

Accordingly, the present invention is provided with the electric part line 150. The electric part line 150 connects each other so that the second radiator R2 and the electric part core M are heat-exchanged therebetween, and is provided with the fourth pump P4 whose driving and stopping are controlled by the control unit 100 and for circulating the coolant. The vehicle is provided with the electric parts such as ECU, OBC, and MOTOR. These electric parts generate heat when the vehicle travels or the battery is charged. Accordingly, the electric part core M is a concept that may be a heat-dissipating unit directly connected to the electric part, etc., and that all includes a heat-dissipating unit indirectly connected to the electric part, etc. Through a separate coolant line. Therefore, it is possible to cool the electric part core M as necessary through the second radiator R2 by use of the outside air of the vehicle.

Accordingly, the present invention is provided with the third radiator line 50. The third radiator line 50 is provided with the third radiator R3. Accordingly, one end portion of the third radiator line 50 is connected to the upstream point of the second heat exchanger 44 in the indoor heating line 40 through the first valve V1, and the other end portion thereof is connected to the downstream point of the second heat exchanger 44 in the indoor heating line 40. Therefore, the third radiator R3 is thermally connected to the second heat exchanger 44 so that the condenser 23 of the refrigerant line 20 dissipates heat through the outside air of the vehicle.

In addition, the present invention is provided with the first bypass line 60. One end portion of the first bypass line 60 is connected to the upstream point of the first heat exchanger 34 in the indoor cooling line 30 through the second valve V2, and the other end portion thereof is connected to the downstream point of the electric part core M in the electric part line 150 through the third valve V3. Therefore, the indoor cooling line 30 and the electric part line 150 may be thermally connected through the first bypass line 60.

Therefore, the electric part line 150 and the indoor cooling line 30 are connected to each other through the first bypass line 60 as necessary, and through this connection, the electric part core M can selectively apply the cooling using the outside air of the vehicle and the cooling using refrigerant. That is, if the electric part core M requires only a small degree of cooling, the electric part line 150 and the indoor cooling line 30 are not connected to each other through the control of the third valve V3, and if the electric part core M requires a strong degree of cooling, the indoor cooling line 30 and the electric part line 150 are connected to each other through the control of the third valve V3 and the first bypass line 60, cooling the electric part core M more reliably.

The present invention is provided with the first inflow line 71 and the second inflow line 72 branched from the upstream point of the first radiator R1 in the battery line 10. The first inflow line 71 and the second inflow line 72 are branched at the same point as shown. Accordingly, the first inflow line 71 has one end portion connected to the indoor cooling line 30 through the second valve V2. Therefore, the indoor cooling line 30 and the battery line 10 are connected to each other through the first inflow line 71 as necessary, and through this connection, the high-voltage battery core B can selectively apply the cooling using the outside air of the vehicle and the cooling using refrigerant. That is, if the high-voltage battery core B requires only a small degree of cooling, the indoor cooling line 30 and the battery line 10 are not connected to each other through the control of the second valve V2, and if the high-voltage battery core B requires a strong degree of cooling, the indoor cooling line 30 and the battery line 10 are connected to each other through the control of the second valve V2 and the first inflow line 71, cooling the high-voltage battery core B more reliably.

Accordingly, the second inflow line 72 has one end portion connected to the indoor heating line 40 through the fourth valve V4, and has the other end portion connected to the third radiator line 50. Therefore, the indoor heating line 40 and the battery line 10 are connected to each other through the second inflow line 72 as necessary, and the high-voltage battery core B can selectively apply the heating using refrigerant. That is, if the high-voltage battery core B requires the heating, the indoor heating line 40 and the battery line 10 are connected to each other through the control of the fourth valve V4. Therefore, the coolant heated by passing through the second heat exchanger 44 connected to the condenser 23 can flow into the high-voltage battery core B, heating the high-voltage battery core B.

More, as in FIG. 1, the thermal management system for the vehicle according to an exemplary embodiment of the present invention can further include a first battery cooling line 80 provided with the cooling adjusting valve V80 branched at the downstream point of the cooling core 32 in the indoor cooling line 30 to be connected to the upstream point of the high-voltage battery core B in the battery line 10, and for adjusting whether the coolant having passed through the cooling core 32 flows into the high-voltage battery core B; and a first battery heating line 90 provided with the heating adjusting valve V90 branched at the upstream point of the heating core 42 in the indoor heating line 40 to be connected to the upstream point of the high-voltage battery core B in the battery line 10, and for adjusting whether the coolant having passed through the high-voltage battery core B flows into the heating core 42.

The present invention is provided with the first battery cooling line 80 and the first battery heating line 90. The first battery cooling line 80 is branched at the downstream point of the cooling core 32 in the indoor cooling line 30 to be connected to the upstream point of the high-voltage battery core B in the battery line 10. Therefore, as in FIG. 2, the coolant having passed through the cooling core 32 of the indoor cooling line 30 can flow into the battery line 10 through the first battery cooling line 80. Therefore, the coolant having passed through the cooling core 32 can flow into the high-voltage battery core B.

The conventional thermal management system for the vehicle was provided with the coolant line and the refrigerant line of the indoor cooling air-conditioning and required separate coolant line and refrigerant line to cool the high-voltage battery. In an exemplary embodiment of the present invention, it is possible to connect the indoor cooling line 30 and the battery line 10 through the first battery cooling line 80 so that the indoor cooling air-conditioning and the cooling of the high-voltage battery core B are performed by only one refrigerant line 20. Therefore, there is an advantage of being eco-friendly by remarkably reducing the amount of refrigerant used. Accordingly, the first battery cooling line 80 is provided with the cooling adjusting valve V80 controlled by the control unit 100 to selectively connect the flow path or control the flow rate. Therefore, it is possible to adjust whether the coolant having passed through the cooling core 32 flows into the high-voltage battery core B according to the control of the cooling adjusting valve V80.

Meanwhile, the first battery heating line 90 is branched at the upstream point of the heating core 42 of the indoor heating line 40 to be connected to the upstream point of the high-voltage battery core B in the battery line 10. Therefore, as in FIG. 7, the coolant having passed through the high-voltage battery core B in the battery line 10 can flow into the indoor heating line 40 through the first battery heating line 90. Accordingly, the coolant having flowed into the indoor heating line 40 can flow into the heating core 42 for indoor air-conditioning. The conventional thermal management system for the vehicle was provided with the coolant line and the refrigerant line of indoor heating air-conditioning, and required separate coolant line and refrigerant line to heat the high-voltage battery. In an exemplary embodiment of the present invention, it is possible to connect the indoor heating line 40 and the battery line 10 through the first battery heating line 90 so that the indoor heating air-conditioning and the heating of the high-voltage battery core B are performed by only one refrigerant line 20. Therefore, there is an advantage of being eco-friendly by remarkably reducing the amount of the refrigerant used. Accordingly, the first battery heating line 90 is provided with the heating adjusting valve V90 controlled by the control unit 100 to selectively connect the flow path or control the flow rate. Therefore, it is possible to adjust whether the coolant having passed through the high-voltage battery core B flows into the heating core 42 according to the control of the heating adjusting valve V90.

Accordingly, as in FIG. 1, the present invention can further include a first branch line 111 branched at the upstream point of the first radiator R1 in the battery line 10, and connected to the upstream point of the second radiator R2 in the electric part line 150; and a second branch line 112 branched at the same point as the first branch line 111 in the battery line 10, and connected to the upstream point of the third radiator R3 in the third radiator line 50 in the electric part line 150, and the first branch line 111 and the second branch line 112 may be connected to the battery line 10 through the fifth valve V5.

The first branch line 111 has one end portion connected to the upstream point of the first radiator R1 in the battery line 10 through the fifth valve V5, and has the other end portion connected to the upstream point of the second radiator R2 in the electric part line 150. Accordingly, the second branch line 112 has one end portion connected to the same point as the first branch line 111 in the battery line 10, and has the other end portion connected to the upstream point of the third radiator R3 in the third radiator line 50 in the electric part line 150. The fifth valve V5 is controlled by the control unit 100 and adjusts the flow of coolant in the first branch line 111, the second branch line 112 and the battery line 10.

In addition, as in FIG. 1, the present invention can further include a third branch line 113 branched at the downstream point of the first radiator R1 in the battery line 10, and connected to the downstream point of the second radiator R2 in the electric part line 150; and a fourth branch line 114 branched at the same point as the third branch line 113 in the battery line 10, and connected to the downstream point of the third radiator R3 in the third radiator line 50, and the third branch line 113 and the fourth branch line 114 may be connected to the battery line 10 through the sixth valve V6.

The third branch line 113 has one end portion connected at the downstream point of the first radiator R1 in the battery line 10 through the sixth valve V6, and has the other end portion connected to the downstream point of the second radiator R2 in the electric part line 150. Accordingly, the fourth branch line 114 has one end portion connected to the same point as the third branch line 113 in the battery line 10, and has the other end portion connected to the downstream point of the third radiator R3 in the third radiator line 50 in the electric part line 150. The sixth valve V6 is controlled by the control unit 100 to adjust the flow of coolant in the third branch line 113, the fourth branch line 114, and the battery line 10.

The conventional thermal management system for the vehicle was provided with the plurality of radiators but this was individually connected to the heat-dissipating object, respectively, limiting heat-dissipating performance. As in FIG. 2, the present invention can integrate the first radiator R1, the second radiator R2, and the third radiator R3 by controlling the fifth valve V5 and the sixth valve V6. In addition, as in FIG. 3, the present invention can control the fifth valve V5 and the sixth valve V6 so that the first radiator R1, the second radiator R2, and the third radiator R3 are connected to only the heat-dissipating object, respectively. Therefore, the present invention can also integrate the radiators, maximizing heat-dissipating performance as necessary.

FIG. 2, FIG. 3 FIG. 4, FIG. 5, FIG. 6, FIG. 7, FIG. 8, FIG. 9, FIG. 10, FIG. 11, and FIG. 12 are diagrams showing each mode of the thermal management system for the vehicle according to an exemplary embodiment of the present invention.

Figure 2:
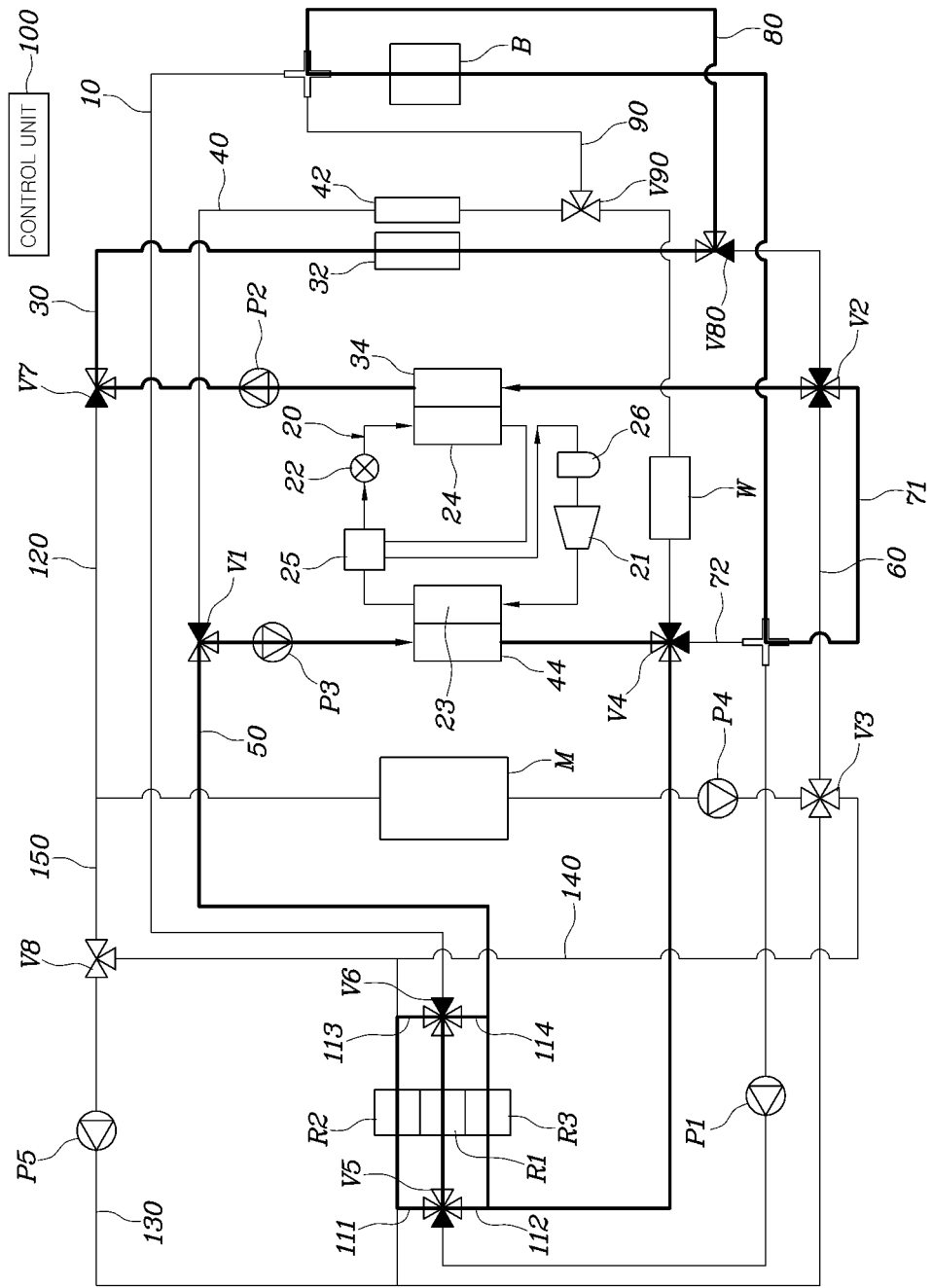
FIG. 2, FIG. 3 FIG. 4, FIG. 5, FIG. 6, FIG. 7, FIG. 8, FIG. 9, FIG. 10, FIG. 11, and FIG. 12 are diagrams showing each mode of the thermal management system for the vehicle according to an exemplary embodiment of the present invention.

As in FIG. 2, the control unit 100 operates the compressor 21 to circulate the refrigerant in the refrigerant line 20, in a first mode for cooling the high-voltage battery core B and discharging the cooled air into the indoor space of the vehicle, controls the first valve V1, the fourth valve V4, the fifth valve V5, and the sixth valve V6 to circulate the coolant so that the second heat exchanger 44 connected to the condenser 23 is selectively heat-exchanged with the first radiator R1, the second radiator R2, and the third radiator R3, and controls the cooling adjusting valve V80 and the second valve V2 to circulate the coolant so that the coolant having passed through the first heat exchanger 34 connected to the evaporator 24 passes through the cooling core 32 and first cools the indoor, flows into the high-voltage battery core B, and then is recovered back to the first heat exchanger 34. This first mode may be a case where the indoor cooling is required due to a very high temperature of the outside air, the cooling of the battery is required in the situation such as charge, and the cooling of the electric part is not required.

, in the first mode, the control unit 100 operates the compressor 21 to circulate the refrigerant in the refrigerant line 20. Accordingly, the control unit 100 controls the first valve V1, the fourth valve V4, and the third pump P3 so that the coolant circulates in a portion of the indoor heating line 40 and the third radiator line 50. Accordingly, the control unit 100 controls the fifth valve V5 and the sixth valve V6 so that the coolant of the third radiator line 50 circulates through all of the first, second, and third radiators R1, R2, R3 through the first, second, third, and fourth branch lines 111, 112, 113, 114. Therefore, the second heat exchanger 44 provided in the indoor heating line 40 and the condenser 23 of the refrigerant line 20 are heat-exchanged to be thermally connected to each other, and the coolant heated in the second heat exchanger 44 is cooled by being heat-exchanged with the outside air in the first, second, and third radiators R1, R2, R3, and then circulates through the second heat exchanger 44 again. Through the present configuration, when the vehicle indoor and the battery require the cooling of the maximum value, the present invention heat-dissipates the condenser 23 by use of all radiators of the system, extremely enhancing the cooling efficiency of the evaporator 24.

Accordingly, the control unit 100 controls the cooling adjusting valve V80, the second valve V2, and the second pump P2 so that the coolant circulates through a portion of the indoor cooling line 30, the first battery cooling line 80, and the first branch line 111. Therefore, the first heat exchanger 34 provided in the indoor cooling line 30 and the evaporator 24 in the refrigerant line 20 heat-exchange therebetween to be thermally connected to each other, and the coolant cooled in the first heat exchanger 34 passes through the cooling core 32 to flow into the high-voltage battery core B through the first battery cooling line 80. Accordingly, the coolant having passed through the high-voltage battery core B flows into the first heat exchanger 34 through the first branch line 111. In the instant case, it is possible to cool the air passing through the cooling core for indoor air-conditioning 32, discharging the cooled air into the indoor space of the vehicle, and to provide the cooled coolant to the high-voltage battery core B, cooling the high-voltage battery core B.

Figure 4:
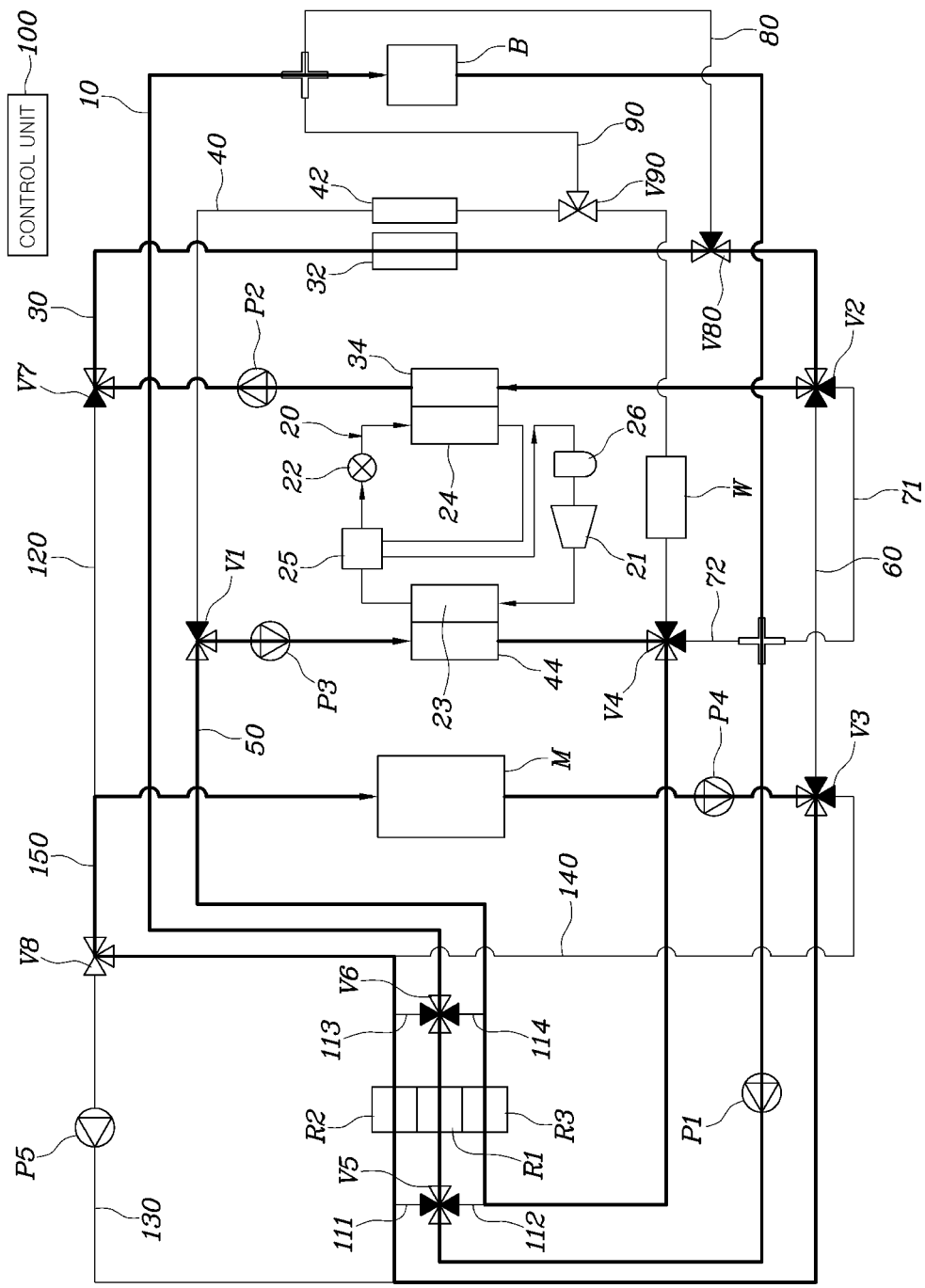

Meanwhile, as in FIG. 4, in the first mode, the control unit 100 controls the first valve V1, the fourth valve V4, and the heating adjusting valve V90 so that the coolant having passed through the second heat exchanger 44 is branched at the fourth valve V4 to flow into the heating core 42. In the instant case, it is also possible for the coolant to partially flow toward the heating core 42 side to mix the cold air with the hot air to discharge it into the indoor at an appropriate temperature.

Figure 3:
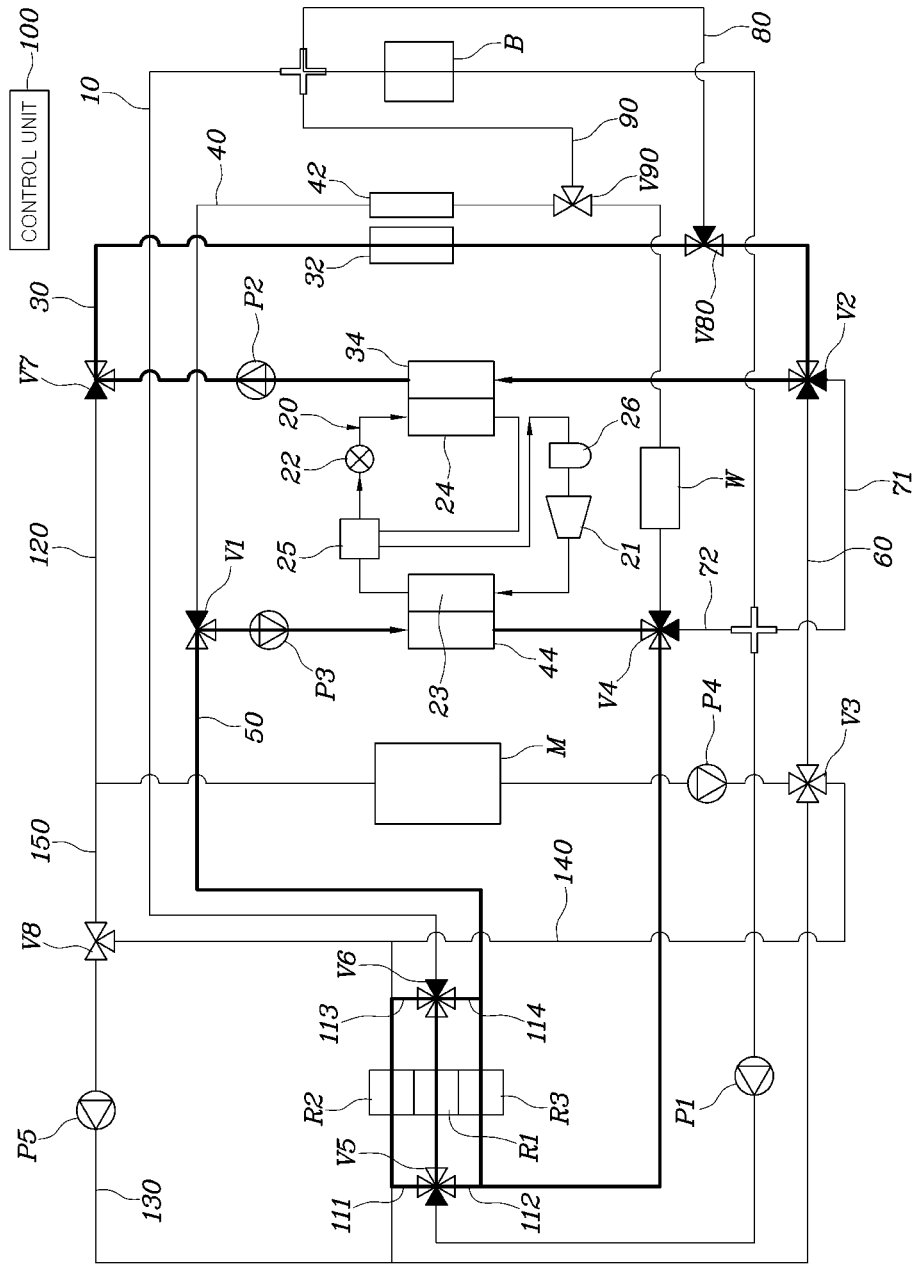

Accordingly, in the thermal management system for the vehicle according to an exemplary embodiment of the present invention, in the second mode that discharges the cooled air into the indoor space of the vehicle as in FIG. 3, the control unit 100 can operate the compressor 21 to circulate the refrigerant of the refrigerant line 20, control the first valve V1, the fourth valve V4, the fifth valve V5, and the sixth valve V6 to circulate the coolant so that the second heat exchanger 44 connected to the condenser 23 is heat-exchanged with the first radiator R1, the second radiator R2, and the third radiator R3, and control the cooling adjusting valve V80 and the second valve V2 to circulate the coolant so that the coolant having passed through the first heat exchanger 34 connected to the evaporator 24 passes through the cooling core 32 and then is recovered back to the first heat exchanger 34. This second mode may be a case where the indoor cooling is required due to a very high temperature of the outside air and the cooling of the high-voltage battery core B and the electric part core M is unnecessary.

In the second mode, the control unit 100 operates the compressor 21 to circulate the refrigerant in the refrigerant line 20. Accordingly, the control unit 100 controls the first valve V1, the fourth valve V4, and the third pump P3 so that the coolant circulates in a portion of the indoor heating line 40 and the third radiator line 50. Accordingly, the control unit 100 controls the fifth valve V5 and the sixth valve V6 so that the coolant of the third radiator line 50 circulates through all of the first, second, and third radiators through the first and second branch lines. Therefore, the second heat exchanger 44 provided in the indoor heating line 40 and the condenser 23 of the refrigerant line 20 are heat-exchanged to be thermally connected to each other, and the coolant heated in the second heat exchanger 44 is cooled by being heat-exchanged with the outside air in the first, second, and third radiators R1, R2, R3 and then circulates through the second heat exchanger 44 again. Accordingly, the control unit 100 controls the cooling adjusting valve V80, the second valve V2, and the second pump P2 so that the coolant circulates in the indoor cooling line 30. Therefore, the first heat exchanger 34 provided in the indoor cooling line 30 and the evaporator 24 in the refrigerant line 20 are heat-exchanged to be thermally connected to each other, and the coolant cooled in the first heat exchanger 34 passes through the cooling core 32 and then flows into the first heat exchanger 34 again. In the instant case, it is possible to cool the air passing through the cooling core for indoor air-conditioning 32, discharging the cooled air into the indoor space of the vehicle, and to provide the coolant cooled in the high-voltage battery core B, cooling the high-voltage battery core B.

Figure 5:
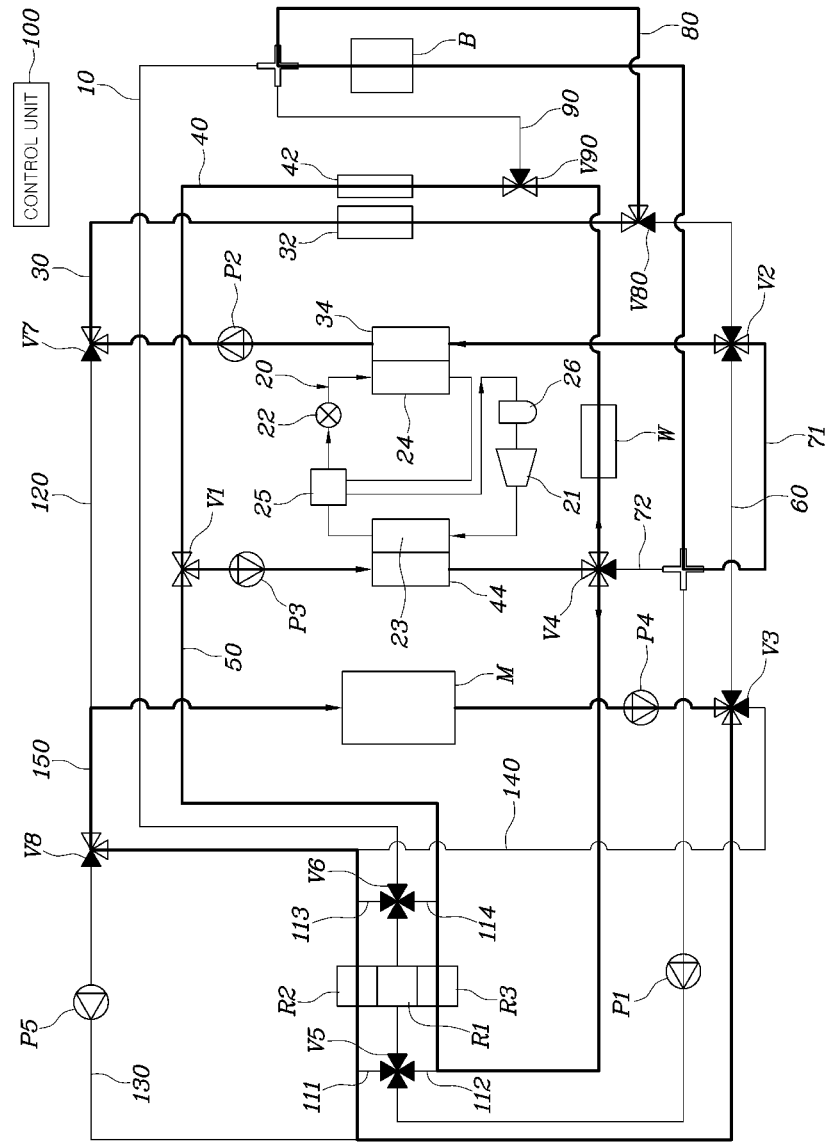

Meanwhile, as in FIG. 5, in the second mode, the control unit 100 can control the first valve V1, the fourth valve V4, and the heating adjusting valve V90 so that the coolant having passed through the second heat exchanger 44 is branched at the fourth valve V4 to flow into the heating core 42. In the instant case, it is also possible for the coolant to partially flow toward the heating core 42 side to mix the cold air with the hot air to discharge it into the indoor at an appropriate temperature.

Accordingly, as in FIG. 4, in the third mode that cools the high-voltage battery core B and the electric part core M by use of the outside air of the vehicle and discharges the cooled air into the indoor space of the vehicle, the control unit 100 can operate the compressor 21 to circulate the refrigerant in the refrigerant line 20, control the fifth valve V5 and the sixth valve V6 so that the coolant does not circulate in the first and second branch lines 111, 112 and the third and fourth branch lines 113, 114 and to circulate the coolant so that the high-voltage battery core B and the first radiator R1 are heat-exchanged therebetween, control the third valve V3 to circulate the coolant so that the electric part core M is heat-exchanged with the second radiator R2, control the first valve V1 and the fourth valve V4 to circulate the coolant so that the second heat exchanger 44 connected to the condenser 23 is heat-exchanged with the third radiator R3, and control the cooling adjusting valve V80 and the second valve V2 to circulate the coolant so that the coolant having passed through the first heat exchanger 34 connected to the evaporator 24 passes through the cooling core 32 and then is recovered back to the first heat exchanger 34. This third mode may be a case where the indoor cooling is required due to a high temperature of the outside air, and the cooling of the high-voltage battery core B and the electric part core M is required.

In the third mode, the control unit 100 operates the compressor 21 to circulate the refrigerant in the refrigerant line 20. Accordingly, the control unit 100 controls the fifth valve V5, the sixth valve V6, and the first pump P1 so that the coolant does not circulate in the first and second branch lines 111, 112 and the third and fourth branch lines 113, 114, and circulates the coolant so that the high-voltage battery core B and the first radiator R1 are heat-exchanged therebetween. Therefore, the coolant heated by passing through the high-voltage battery core B is cooled by being heat-dissipated through the first radiator R1 and then flows into the high-voltage battery core B again. Accordingly, the control unit 100 controls the third valve V3 and the fourth pump P4 so that the coolant circulates in the electric part line 150. Therefore, the coolant heated by passing through the electric part core M is cooled by being heat-dissipated through the second radiator R2 and then flows into the electric part core M again. Accordingly, the control unit 100 controls the first valve V1, the fourth valve V4, and the third pump P3 to circulate the coolant so that the second heat exchanger 44 heat-exchanges with the third radiator R3. Therefore, the second heat exchanger 44 provided in the indoor heating line 40 and the condenser 23 of the refrigerant line 20 are heat-exchanged to be thermally connected to each other, and the coolant heated in the second heat exchanger 44 is cooled by being heat-exchanged with the outside air in the third radiator R3 and then circulates through the second heat exchanger 44 again. Accordingly, the control unit 100 controls the cooling adjusting valve V80, the second valve V2, and the second pump P2 so that the coolant circulates in the indoor cooling line 30. Therefore, the first heat exchanger 34 provided in the indoor cooling line 30 and the evaporator 24 in the refrigerant line 20 are heat-exchanged to be thermally connected to each other, and the coolant cooled in the first heat exchanger 34 passes through the cooling core 32 and then flows into the first heat exchanger 34 again. In the instant case, it is possible to cool the air passing through the cooling core for indoor air-conditioning 32, discharging the cooled air into the indoor space of the vehicle, and to provide the cooled coolant to the high-voltage battery core B, cooling the high-voltage battery core B.

Meanwhile, as in FIG. 5, in the third mode, the control unit 100 controls the first valve V1, the fourth valve V4, and the heating adjusting valve V90 so that the coolant having passed through the second heat exchanger 44 is branched at the fourth valve V4 to flow into the heating core 42. In the instant case, it is also possible for the coolant to partially flow toward the heating core 42 side to mix the cold air with the hot air to discharge it into the indoor at an appropriate temperature.

Accordingly, in the thermal management system for the vehicle according to an exemplary embodiment of the present invention, in the fourth mode that cools the electric part core M by use of the outside air of the vehicle, cools the high-voltage battery core B by use of the refrigerant line 20, and discharges the cooled air into the indoor space of the vehicle as in FIG. 5, the control unit 100 can operate the compressor 21 to circulate the refrigerant in the refrigerant line 20, control the fifth valve V5 and the sixth valve V6 so that the coolant does not circulate in the first and second branch lines and the third and fourth branch lines, control the third valve V3 to circulate the coolant so that the electric part core M is heat-exchanged with the second radiator R2, control the first valve V1 and the fourth valve V4 to circulate the coolant so that the second heat exchanger 44 connected to the condenser 23 is heat-exchanged with the third radiator R3, and control the cooling adjusting valve V80 and the second valve V2 to circulate the coolant so that the coolant having passed through the first heat exchanger 34 connected to the evaporator 24 passes through the cooling core 32, first cools the indoor, flows into the high-voltage battery core B, and then is recovered back to the first heat exchanger 34. This fourth mode may be a case where the indoor cooling is required due to a high temperature of the outside air, the cooling of the electric part core M is required, and the required cooling amount of the high-voltage battery core B is large.

In the fourth mode, the control unit 100 operates the compressor 21 to circulate the refrigerant in the refrigerant line 20. Accordingly, the control unit 100 controls the fifth valve V5, the sixth valve V6, and the first pump P1 so that the coolant does not circulate in the first and second branch lines and the third and fourth branch lines, and circulates the coolant so that the high-voltage battery core B and the first radiator R1 are heat-exchanged therebetween. Therefore, the coolant heated by passing through the high-voltage battery core B is cooled by being heat-dissipated through the first radiator R1 and then flows into the high-voltage battery core B again. Accordingly, the control unit 100 controls the third valve V3 and the fourth pump P4 so that the coolant circulates in the electric part line 150. Therefore, the coolant heated by passing through the electric part core M is cooled by being heat-dissipated through the second radiator R2 and then flows into the electric part core M again. Accordingly, the control unit 100 controls the first valve V1, the fourth valve V4, and the third pump P3 to circulate the coolant so that the second heat exchanger 44 is heat-exchanged with the third radiator R3. Therefore, the second heat exchanger 44 provided in the indoor heating line 40 and the condenser 23 of the refrigerant line 20 are heat-exchanged to be thermally connected to each other, and the coolant heated in the second heat exchanger 44 is cooled by being heat-exchanged with the outside air in the third radiator R3 and then circulates the second heat exchanger 44 again. Accordingly, the control unit 100 controls the cooling adjusting valve V80, the second valve V2, and the second pump P2 so that the coolant circulates in the indoor cooling line 30. Therefore, the first heat exchanger 34 provided in the indoor cooling line 30 and the evaporator 24 in the refrigerant line 20 is heat-exchanged to be thermally connected to each other, and the coolant cooled in the first heat exchanger 34 passes through the cooling core 32 and then flows into the first heat exchanger 34 again. In the instant case, it is possible to cool the air passing through the cooling core for indoor air-conditioning 32, discharging the cooled air into the indoor space of the vehicle, and to provide the cooled coolant to the high-voltage battery core B, cooling the high-voltage battery core B.

Meanwhile, as in FIG. 5, in the fourth mode, the control unit 100 can control the first valve V1, the fourth valve V4, and the heating adjusting valve V90 so that the coolant having passed through the second heat exchanger 44 is branched at the fourth valve V4 to flow into the third radiator R3 and the heating core 42. In the instant case, it is also possible for the coolant to partially flow toward the heating core 42 side to mix the cold air with the hot air to discharge it into the indoor at an appropriate temperature.

Accordingly, as in FIG. 1, the thermal management system for the vehicle according to an exemplary embodiment of the present invention can further include a second bypass line 120 having one end portion connected to the downstream point of the first heat exchanger 34 in the indoor cooling line 30 through the seventh valve V7, and having the other end portion connected to the upstream point of the electric part core M in the electric part line 150; and a third bypass line 130 having one end portion connected to the downstream point of the second radiator R2 in the electric part line 150 through the eighth valve V8, and having the other end portion connected to the upstream point of the second radiator R2 in the electric part line 150.

The present invention is provided with the second bypass line 120 and the third bypass line 130. One end portion of the second bypass line 120 is connected to the downstream point of the first heat exchanger 34 in the indoor cooling line 30 through the seventh valve V7, and the other end portion thereof is connected to the upstream point of the electric part core M in the electric part line 150. Therefore, the indoor cooling line 30 and the electric part line 150 may be thermally connected to each other through the second bypass line 120.

Accordingly, one end portion of the third bypass line 130 is connected to the downstream point of the second radiator R2 in the electric part line 150 through the eighth valve V8, and the other end portion thereof is connected to the upstream point of the second radiator R2 in the electric part line 150. Meanwhile, the third bypass line 130 is provided with the fifth pump P5 whose driving and stopping are controlled by the control unit 100 and for circulating the coolant.

Figure 6:
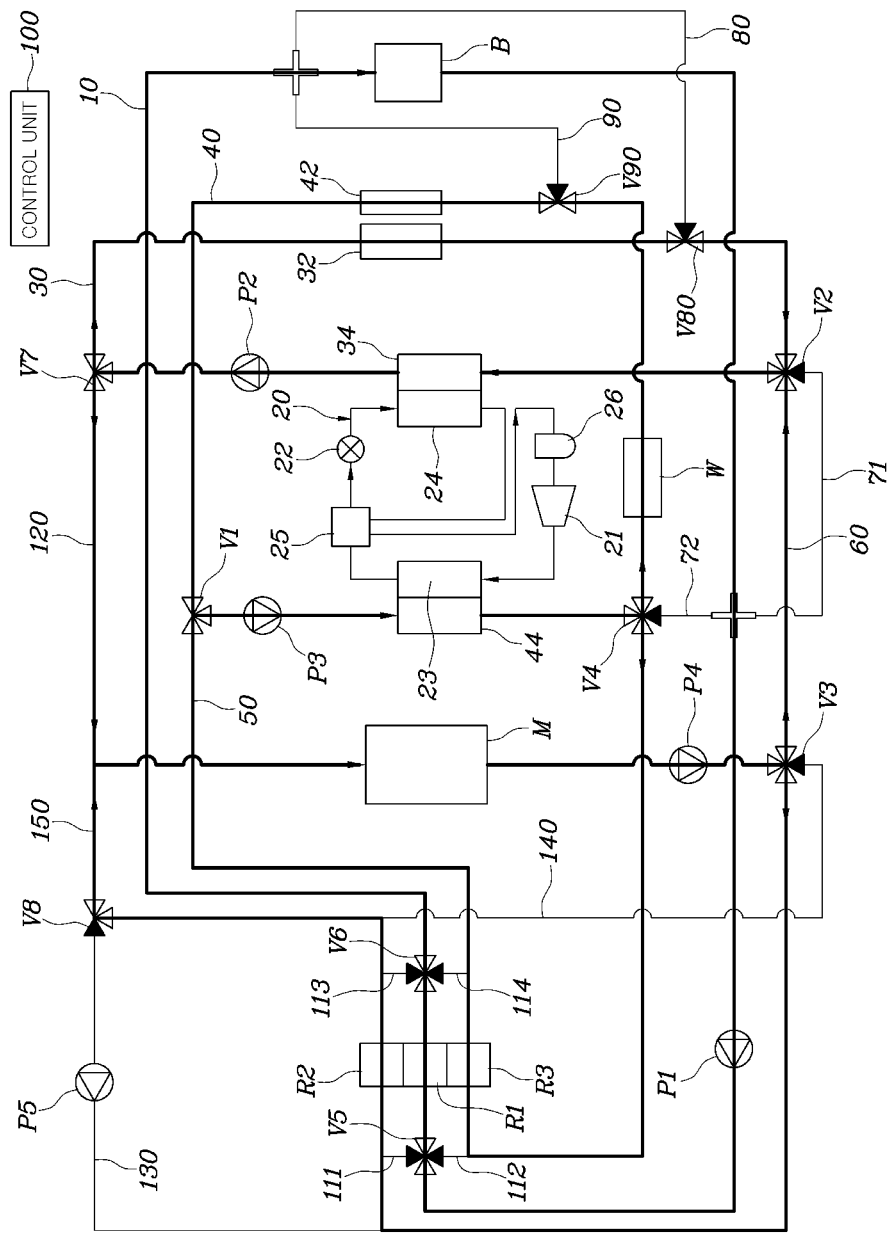

Accordingly, in the thermal management system for the vehicle according to an exemplary embodiment of the present invention, in the fifth mode that cools the high-voltage battery core B and the electric part core M and discharges the heated air into the indoor space of the vehicle as in FIG. 6, the control unit 100 can operate the compressor 21 to circulate the refrigerant in the refrigerant line 20, control the fifth valve V5 and the sixth valve V6 so that the coolant does not circulate in the first and second branch lines and the third and fourth branch lines, control the third valve V3 and the eighth valve V8 to circulate the coolant so that the coolant having passed through the electric part core M is branched to flow into the first bypass line 60 and the second radiator R2, control the cooling adjusting valve V80, the second valve V2, and the seventh valve V7 to circulate the coolant so that the coolant having passed through the first heat exchanger 34 connected to the evaporator 24 is branched to flow into the second bypass line 120 and the cooling core 32 and to circulate the coolant so that the high-voltage battery core B is heat-exchanged with the first radiator R1, and control the heating adjusting valve V90, the first valve V1, and the fourth valve V4 to circulate the coolant so that the coolant having passed through the second heat exchanger 44 connected to the condenser 23 passes through the heating core 42 and then is recovered back to the second heat exchanger 44. This fifth mode may be a case where the indoor heating is required due to a low temperature of the outside air, and the cooling of the high-voltage battery core B and the electric part core M is required.

In the fifth mode, the control unit 100 operates the compressor 21 to circulate the refrigerant in the refrigerant line 20. Accordingly, the control unit 100 controls the fifth valve V5 and the sixth valve V6 so that the coolant does not circulate in the first and second branch lines 111, 112 and the third and fourth branch lines 113, 114. Accordingly, the control unit 100 controls the third valve V3, the eighth valve V8, and the fourth pump P4 to circulate the coolant so that the coolant having passed through the electric part core M is branched to flow into the first bypass line 60 and the second radiator R2. In the instant case, the coolant flowing into the second radiator R2 is cooled by being heat-dissipated in the second radiator R2 and then flows into the electric part core M again. Accordingly, the control unit 100 controls the cooling adjusting valve V80, the second valve V2, the seventh valve V7, and the second pump P2 to circulate the coolant so that the coolant having passed through the first heat exchanger 34 is branched to flow into the second bypass line 120 and the cooling core 32. In the instant case, the coolant is cooled by passing through the first heat exchanger 34 and then branched at the seventh valve V7 to flow into the second bypass line 120 and the cooling core for indoor air-conditioning 32, respectively. Accordingly, the control unit 100 controls the first pump P1 to circulate the coolant so that the high-voltage battery core B is heat-exchanged with the first radiator R1.

In the instant case, the air passing through the heating core 42 for indoor air-conditioning may be heated, discharging the heated air into the indoor space of the vehicle. Accordingly, it is possible to cool the electric part core M and the high-voltage battery core B. Meanwhile, as in FIG. 6, the control unit 100 can control the seventh valve V7 so that the coolant having passed through the first heat exchanger 34 is branched to flow into the cooling core 32. In the instant case, it is possible to mix the cold air with the hot air to discharge it into the indoor space of the vehicle at an appropriate temperature. In addition, the control unit 100 can control the seventh valve V7 to control so that the coolant having passed through the first heat exchanger 34 does not flow into the cooling core 32, also discharging only the hot air into the indoor space of the vehicle.

Meanwhile, as in FIG. 1, the thermal management system for the vehicle according to an exemplary embodiment of the present invention can further include a fourth bypass line 140 having one end portion connected to a point between the third branch line 113 and the eighth valve V8 in the electric part line 150, and having the other end portion connected to the third valve V3. The fourth bypass line 140 has one end portion connected to the downstream point of the second radiator R2 in the electric part line 150, and has the other end portion connected to the third valve V3. Therefore, the first bypass line 60, the fourth bypass line 140, and the electric part line 150 may be connected to each other through the third valve V3.

Figure 7:
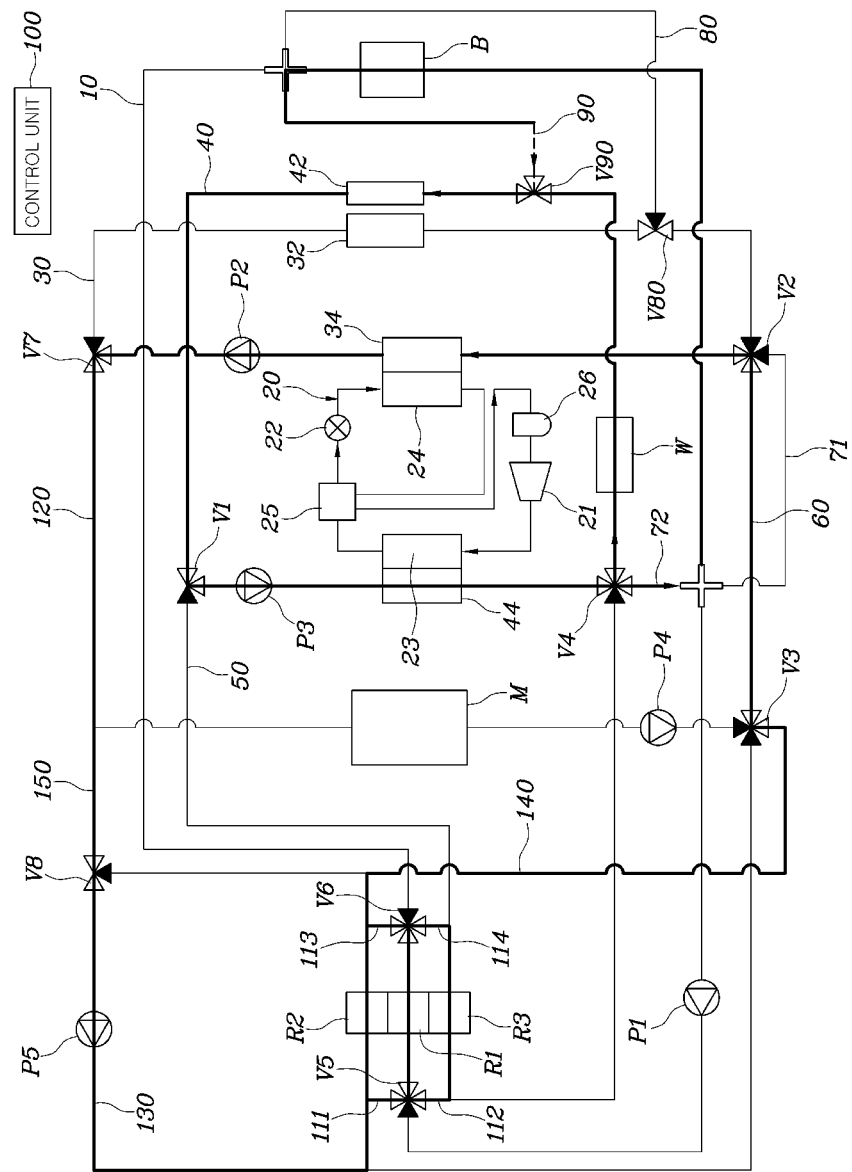

Accordingly, as in FIG. 7, in the thermal management system for the vehicle according to an exemplary embodiment of the present invention, in the sixth mode that heats the high-voltage battery core B and discharges the heated air into the indoor space of the vehicle, the control unit 100 can operate the compressor 21 to circulate the refrigerant in the refrigerant line 20, control the second valve V2, the third valve V3, the fifth valve V5, the sixth valve V6, the seventh valve V7, and the eighth valve V8 to circulate the coolant so that the first heat exchanger 34 connected to the evaporator 24 is selectively heat-exchanged with the first, second, and third radiators, control the heating adjusting valve V90, the first valve V1, and the second valve V2 to circulate the coolant so that the coolant having passed through the second heat exchanger 44 connected to the condenser 23 is branched to flow into the heating adjusting valve V90 and the high-voltage battery core B, and circulate the coolant so that the coolant having passed through the high-voltage battery core B flows into the heating adjusting valve V90 and then flows into the heating core 42. This sixth mode may be a case where the indoor heating is required due to a low temperature of the outside air, and the heating of the high-voltage battery core B is required.

In the sixth mode, the control unit 100 operates the compressor 21 to circulate the refrigerant in the refrigerant line 20. Accordingly, the control unit 100 controls the second valve V2, the third valve V3, the fifth valve V5, the sixth valve V6, the seventh valve V7, the eighth valve V8, the second pump P2, and the fifth pump P5 to circulate the coolant so that the first heat exchanger 34 connected to the evaporator 24 is selectively heat-exchanged with the first, second, and third radiators. Accordingly, the control unit 100 controls the heating adjusting valve V90, the first valve V1, and the second valve V2 to circulate the coolant so that the coolant having passed through the second heat exchanger 44 connected to the condenser 23 is branched to flow into the heating adjusting valve V90 and the high-voltage battery core B. In the instant case, the coolant heated by passing through the second heat exchanger 44 can flow into the high-voltage battery core B to heat the high-voltage battery core B. Accordingly, the coolant having passed through the high-voltage battery core B flows into the heating adjusting valve V90 and then flows into the heating core 42. Therefore, it is possible to heat the air having passed through the heating core 42 to discharge the heated air into the indoor space of the vehicle.

Figure 8:
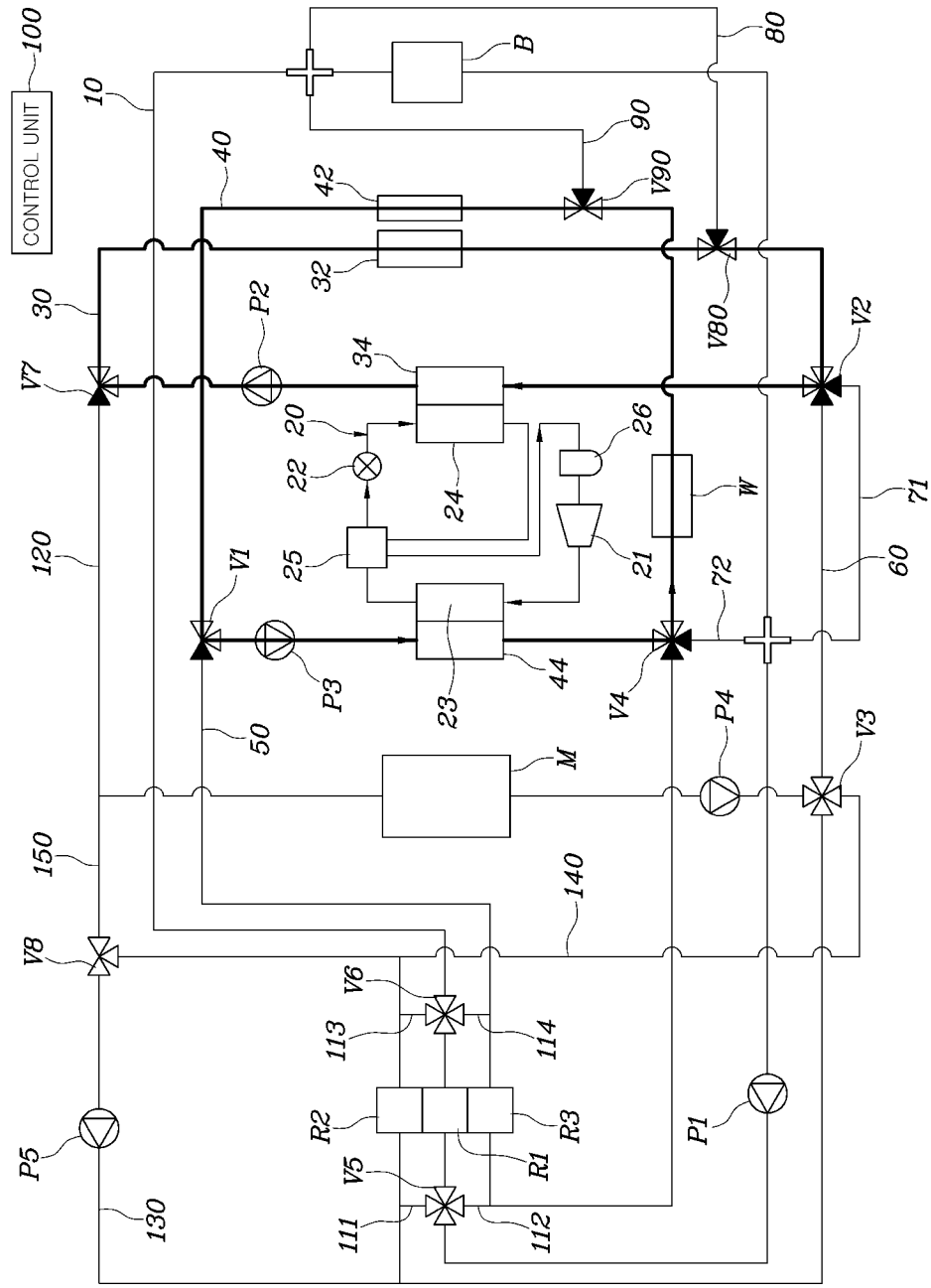

Accordingly, in the thermal management system for the vehicle according to an exemplary embodiment of the present invention, in the seventh mode that discharges the dehumidified air into the indoor space of the vehicle as in FIG. 8, the control unit 100 can operate the compressor 21 to circulate the refrigerant in the refrigerant line 20, control the heating adjusting valve V90, the first valve V1, and the fourth valve V4 to circulate the coolant so that the coolant having passed through the second heat exchanger 44 connected to the condenser 23 flows into the heating core 42, and control the cooling adjusting valve V80, the second valve V2, and the seventh valve V7 to circulate the coolant so that the coolant having passed through the first heat exchanger 34 connected to the evaporator 24 flows into the cooling core 32. This seventh mode is a case where it is necessary to discharge the dehumidified air into the indoor space of the vehicle.

In the seventh mode, the control unit 100 operates the compressor 21 to circulate the refrigerant in the refrigerant line 20. Accordingly, the control unit 100 controls the heating adjusting valve V90, the first valve V1, and the fourth valve V4 to circulate the coolant so that the coolant having passed through the second heat exchanger 44 connected to the condenser 23 flows into the heating core 42. Accordingly, the control unit 100 controls the cooling adjusting valve V80, the second valve V2, and the seventh valve V7 to circulate the coolant so that the coolant having passed through the first heat exchanger 34 connected to the evaporator 24 flows into the cooling core 32. Therefore, the air dehumidified and cooled by passing through the cooling core 32 may be heated by passing through the heating core 42 to discharge the dehumidified air into the indoor space of the vehicle. As a result, it is possible to reduce the humidity of the indoor space of the vehicle by implementing the seventh mode when the windshield of the vehicle is frosted, etc., removing frost, etc.

Figure 9:
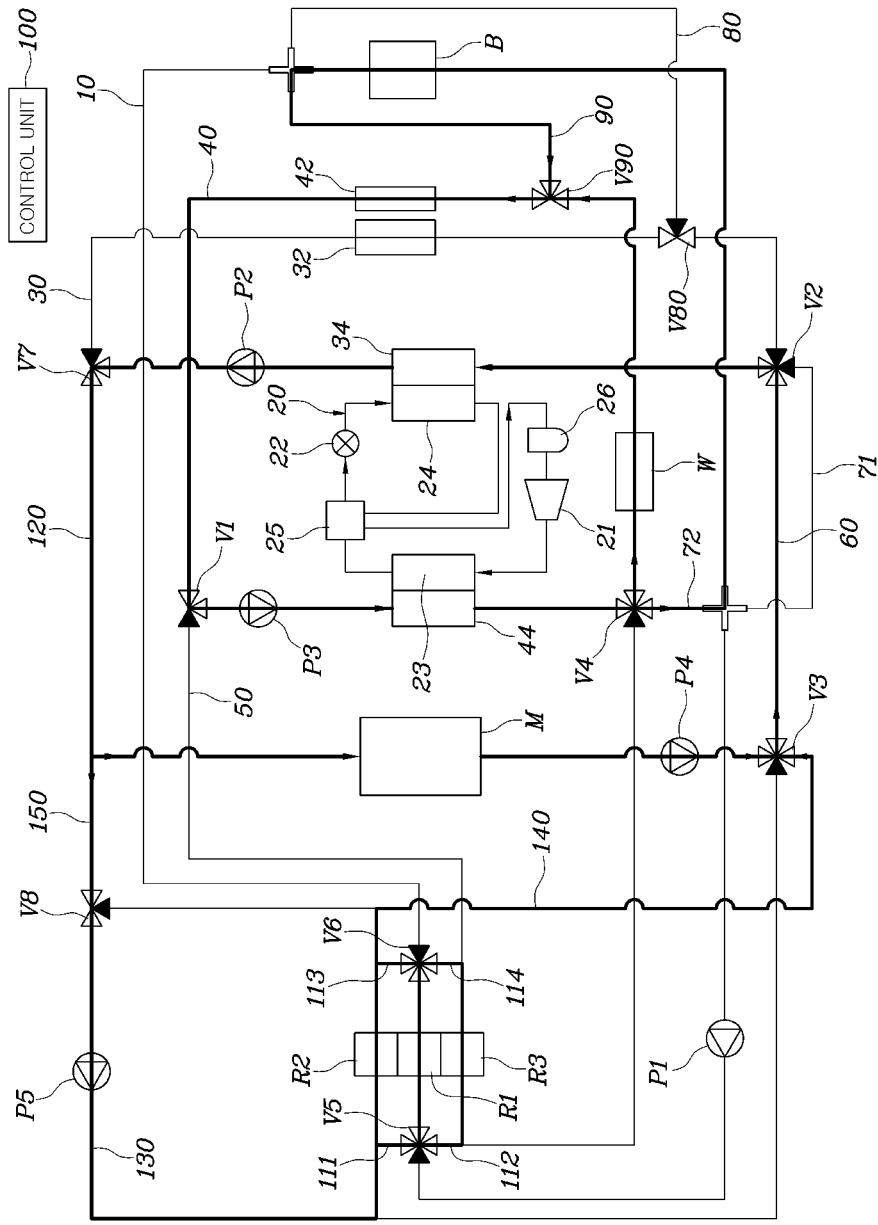

Accordingly, in the thermal management system for the vehicle according to an exemplary embodiment of the present invention, in the eighth mode that cools the electric part core M, heats the high-voltage battery core B and discharges the heated air into the indoor space of the vehicle as in FIG. 9, the control unit 100 can operate the compressor 21 to circulate the refrigerant in the refrigerant line 20, control the second valve V2, the third valve V3, the fifth valve V5, the sixth valve V6, the seventh valve V7, and the eight valve V8 to circulate the coolant so that the first heat exchanger 34 and the electric part core M are heat-exchanged with the first radiator R1, the second radiator R2, and the third radiator R3, control the heating adjusting valve V90, the first valve V1, and the second valve V2 to circulate the coolant so that the coolant having passed through the second heat exchanger 44 is branched to flow into the heating adjusting valve V90 and the high-voltage battery core B, and circulate the coolant so that the coolant having passed through the high-voltage battery core B flows into the heating adjusting valve V90 and then flows into the heating core 42. This eighth mode is a case where the heating of the indoor space of the vehicle is required due to a low temperature of the outside air, and the heating of the high-voltage battery core B is required.

In the eighth mode, the control unit 100 operates the compressor 21 to circulate the refrigerant in the refrigerant line 20. Accordingly, the control unit 100 controls the second valve V2, the third valve V3, the fifth valve V5, the sixth valve V6, the seventh valve V7, the eighth valve V8, the second pump P2, and the fifth pump P5 to circulate the coolant so that the first heat exchanger 34 and the electric part core M connected to the evaporator 24 is heat-exchanged with the first, second, and third radiators. Accordingly, the control unit 100 controls the heating adjusting valve V90, the first valve V1, the second valve V2, and the third pump P3 to circulate the coolant so that the coolant having passed through the second heat exchanger 44 connected to the condenser 23 is branched to flow into the heating adjusting valve V90 and the high-voltage battery core B. Therefore, the coolant heated in the second heat exchanger 44 can flow into the high-voltage battery core B to heat the high-voltage battery core B. Accordingly, the coolant can also flow into the heating core 42 to heat-exchange with the air passing through the heating core 42. Therefore, it is possible to heat the air passing through the heating core 42 to discharge the heated air into the indoor space of the vehicle. Accordingly, in the eighth mode, the control unit 100 can also control the second valve V2 and the seventh valve V7 as necessary to flow the coolant into the cooling core for 32 indoor air-conditioning to mix the cold air with the hot air at an appropriate temperature to discharge it into the indoor space of the vehicle.

Figure 10:
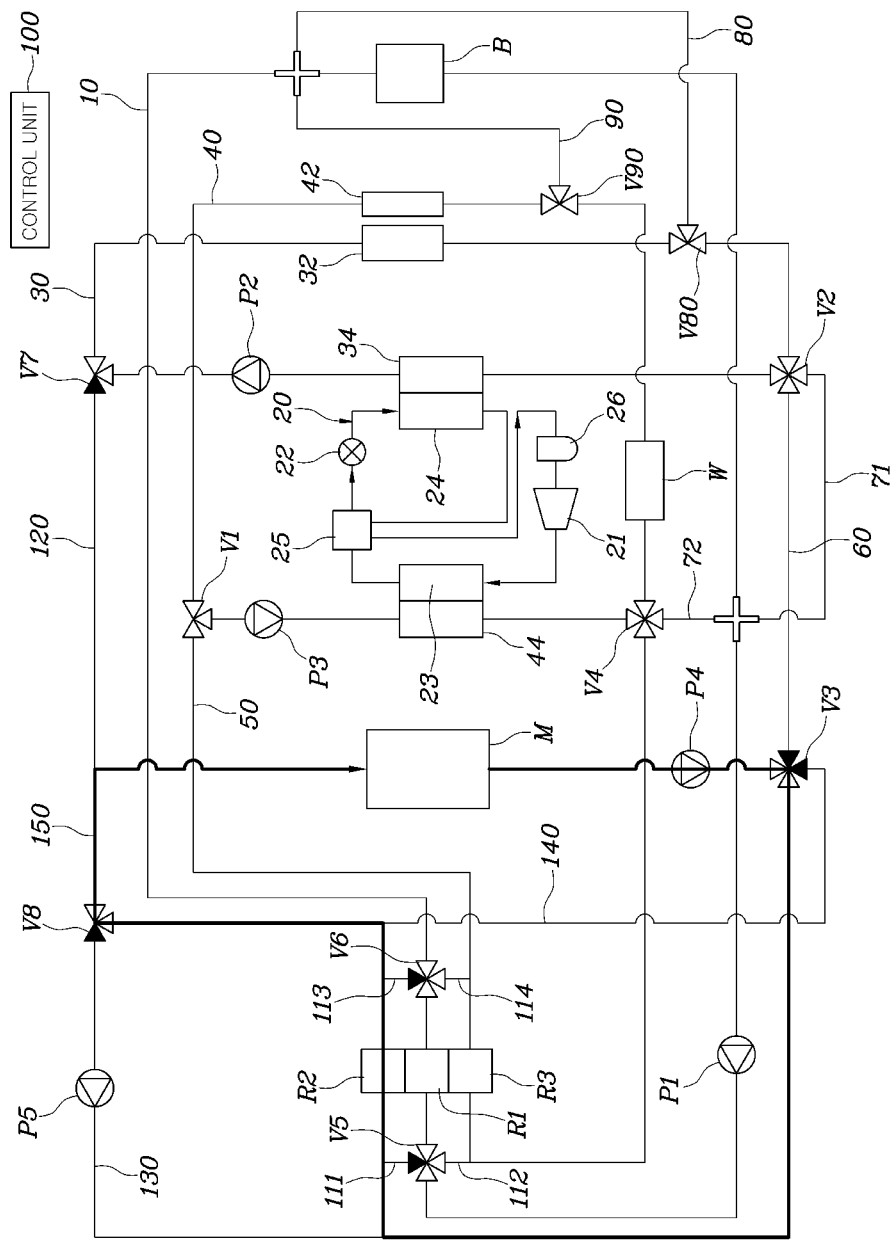

Accordingly, in the thermal management system for the vehicle according to an exemplary embodiment of the present invention, in the ninth mode that cools the electric part core M by use of the outside air of the vehicle as in FIG. 10, the control unit 100 can control the third valve V3 and the eighth valve V8 to circulate the coolant so that the electric part core M is heat-exchanged with the second heat exchanger 44. This ninth mode is a case where the cooling of the electric part core M is required.

In the ninth mode, the control unit 100 can control the third valve V3, the eighth valve V8, and the fourth pump P4 to circulate the coolant so that the electric part core M is heat-exchanged with the second radiator R2. That is, the coolant having recovered the waste heat of the electric part core M by passing through the electric part core M flows into the second radiator R2 to be heat-dissipated by heat-exchanging with the outside air of the vehicle in the second radiator R2. Therefore, the coolant cooled by passing through the second radiator R2 flows into the electric part core M again.

Figure 11:
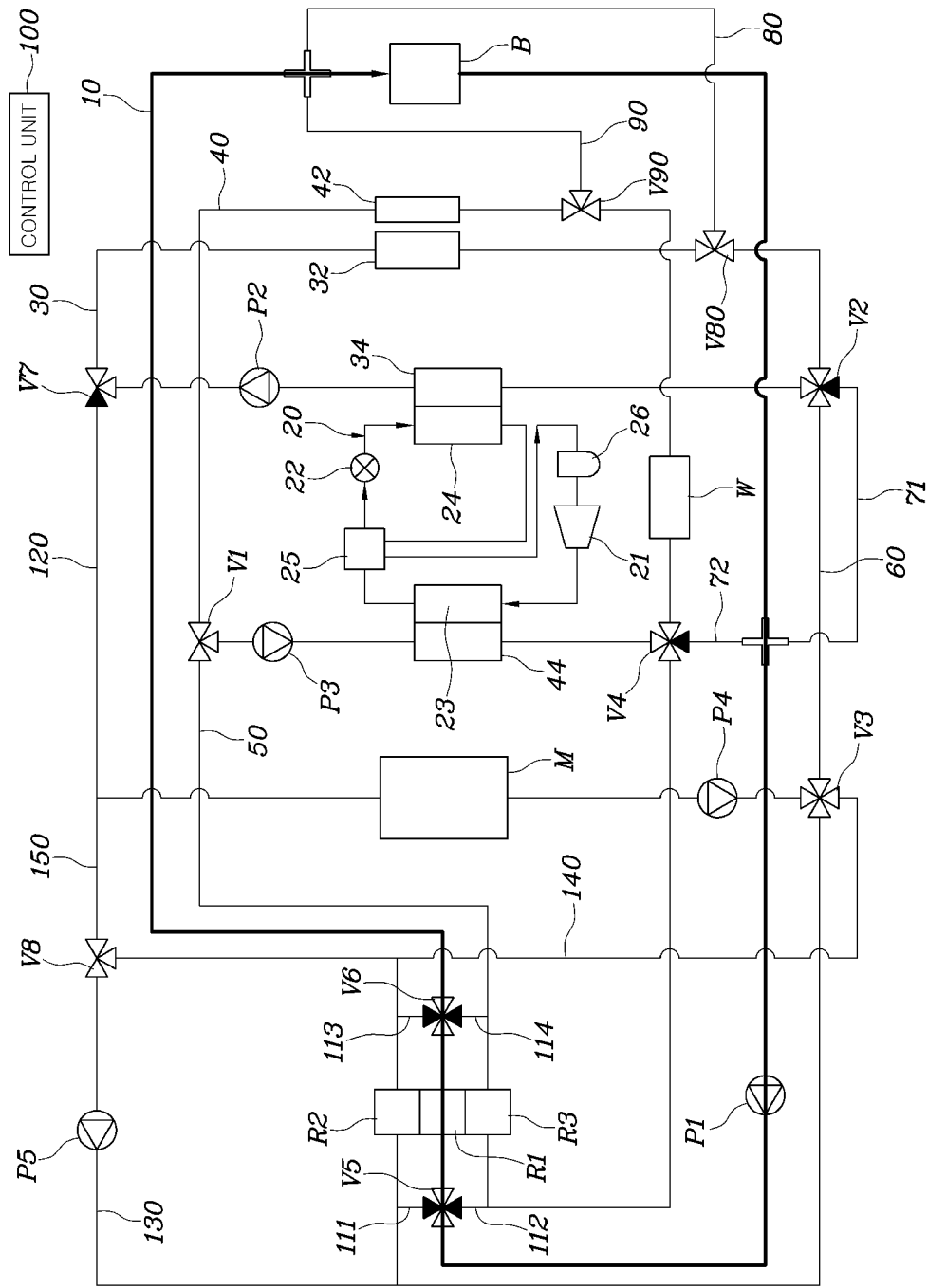

Accordingly, in the thermal management system for the vehicle according to an exemplary embodiment of the present invention, in the tenth mode that cools the high-voltage battery core B by use of the outside air of the vehicle as in FIG. 11, the control unit 100 can control the fifth valve V5 and the sixth valve V6 to circulate the coolant so that the high-voltage battery core B is heat-exchanged with the first heat exchanger 34. This tenth mode is a case where the cooling of the high-voltage battery core B is required.

In the tenth mode, the control unit 100 can control the fifth valve V5, the sixth valve V6, and the first pump P1 to circulate the coolant so that the electric part core M is heat-exchanged with the second radiator R2. That is, the coolant having recovered the waste heat of the high-voltage battery core B by passing through the high-voltage battery core B flows into the first radiator R1 to be heat-dissipated by heat-exchanging with the outside air of the vehicle in the first radiator R1. Therefore, the coolant cooled by passing through the first radiator R1 flows into the high-voltage battery core B again.

Figure 12:
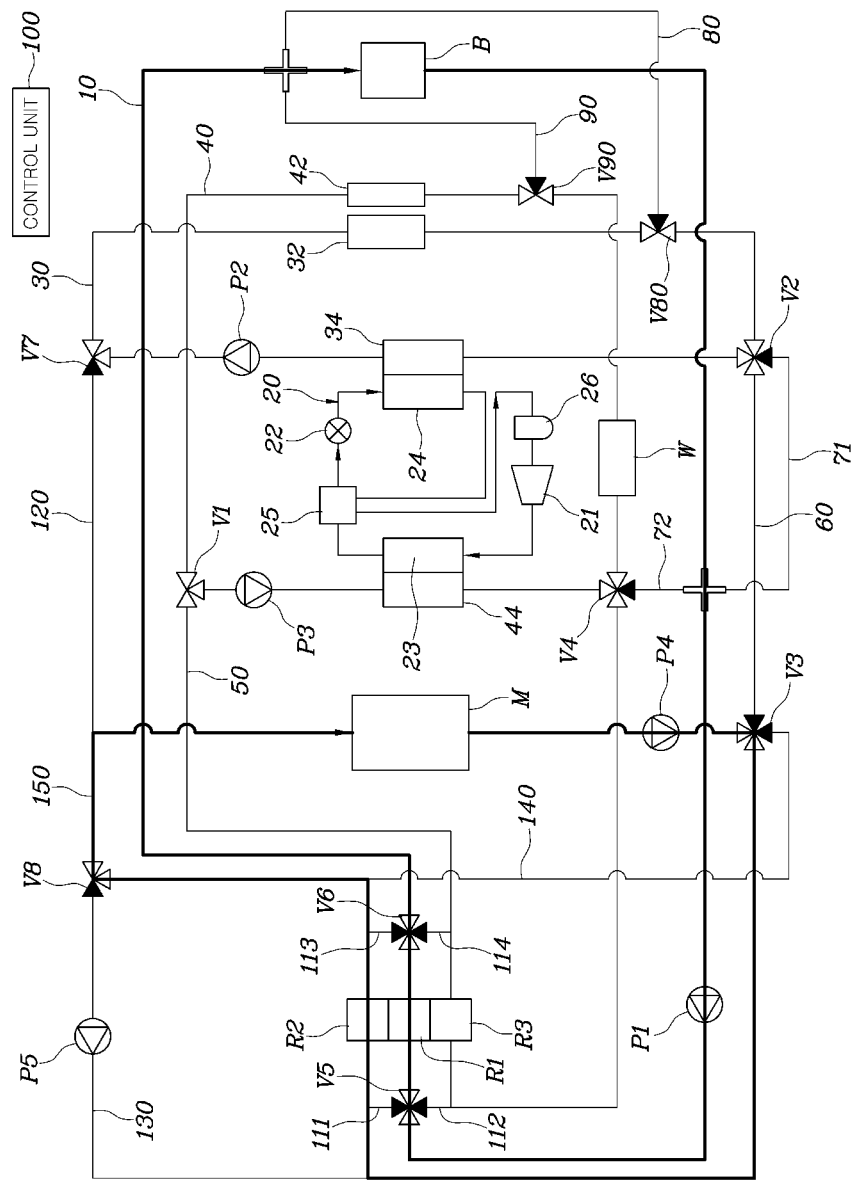

Accordingly, in the thermal management system for the vehicle according to an exemplary embodiment of the present invention, in the eleventh mode that cools the electric part core M and the high-voltage battery core B by use of the outside air of the vehicle as in FIG. 12, the control unit 100 can control the third valve V3 and the eighth valve V8 to circulate the coolant so that the electric part core M is heat-exchanged with the second heat exchanger 44, and control the fifth valve V5 and the sixth valve V6 to circulate the coolant so that the high-voltage battery core B is heat-exchanged with the first heat exchanger 34. This eleventh mode is a case where the cooling of the electric part core M and the high-voltage battery core B is required.

In the eleventh mode, the control unit 100 can control the third valve V3, the eighth valve V8, and the fourth pump P4 to circulate the coolant so that the electric part core M is heat-exchanged with the second radiator R2. That is, the coolant having recovered the waste heat of the electric part core M by passing through the electric part core M flows into the second radiator R2 to be heat-dissipated by heat-exchanging with the outside air of the vehicle in the second radiator R2. Therefore, the coolant cooled by passing through the second radiator R2 flows into the electric part core M again.

In addition, the control unit 100 can control the fifth valve V5, the sixth valve V6, and the first pump P1 to circulate the coolant so that the electric part core M is heat-exchanged with the second radiator R2. That is, the coolant having recovered the waste heat of the high-voltage battery core B by passing through the high-voltage battery core B flows into the first radiator R1 to be heat-dissipated by heat-exchanging with the outside air of the vehicle in the first radiator R1. Therefore, the coolant cooled by passing through the first radiator R1 flows into the high-voltage battery core B again.

Accordingly, in an exemplary embodiment of the present invention, as in FIG. 1, FIG. 2, FIG. 3, FIG. 4, FIG. 5, FIG. 6, FIG. 7, FIG. 8, FIG. 9, FIG. 10, FIG. 11 and FIG. 12, the indoor heating line 40 may be separately provided with a water heater W for heating the coolant. In addition, although not separately shown, a reservoir tank for supplying the coolant may be separately provided on each line to supply the coolant as well.

According to the thermal management system for the vehicle of the present invention, it is possible to efficiently manage the energy necessary for the indoor air-conditioning, the cooling of the electric part, or the cooling and heating of the battery in the field of the thermal management for the vehicle.

It is possible to use by dividing or integrating the plurality of radiators effectively, maximizing the cooling and heating efficiency, and to integrate the thermal management system, remarkably reducing the amount of the refrigerant used.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A thermal management system for a vehicle, the thermal management system comprising:
    a battery line including a battery core so that a first radiator and the battery core are configured to exchange heat with each other, and through which coolant flows;
    a refrigerant line including a compressor, an expansion valve, a condenser, and an evaporator;
    an indoor cooling line including a cooling core so that the cooling core for indoor air-conditioning is heat-exchanged with the evaporator through a first heat exchanger, and through which the coolant flows;
    an indoor heating line including a heating core so that the heating core for indoor air-conditioning is heat-exchanged with the condenser through a second heat exchanger, and through which the coolant flows;
    an electric part line including an electric part core so that a second radiator and the electric part core are configured to exchange heat with each other, and through which the coolant flows;
    a radiator line connected to a third radiator, having a first end portion connected to an upstream point of the second heat exchanger in the indoor heating line through a first valve, and having a second end portion connected to a downstream point of the second heat exchanger in the indoor heating line through a second valve;
    a first bypass line having a first end portion connected to an upstream point of the first heat exchanger in the indoor cooling line through a third valve, and having a second end portion connected to a downstream point of the electric part core in the electric part line through a fourth valve;
    a first inflow line branched at an upstream point of the first radiator in the battery line and connected to the indoor cooling line and the first bypass line through the third valve and a second inflow line branched at a same point as the first inflow line in the battery line and connected to the indoor heating line and the radiator line through the second valve; and
    a controller for controlling operations of the compressor and a plurality of valves including the expansion valve and the first to fourth valves.

2. The thermal management system for the vehicle according to claim 1, further including
    a first battery cooling line provided with a cooling adjusting valve branched at a downstream point of the cooling core in the indoor cooling line to be connected to an upstream point of the battery core in the battery line, and for adjusting when the coolant having passed through the cooling core flows into the battery core; and
    a first battery heating line provided with a heating adjusting valve branched at a upstream point of the heating core in the indoor heating line to be connected to an upstream point of the battery core in the battery line, and for adjusting when the coolant having passed through the battery core flows into the heating core.

3. The thermal management system for the vehicle according to claim 2, further including
    a first branch line branched at the upstream point of the first radiator in the battery line, and connected to an upstream point of the second radiator in the electric part line; and
    a second branch line branched at a same point as the first branch line in the battery line, and connected to an upstream point of the third radiator in the radiator line in the electric part line,
    wherein the first branch line and the second branch line are connected to the battery line through a fifth valve, and
    wherein the plurality of valves includes the fifth valve.

4. The thermal management system for the vehicle according to claim 3, further including
    a third branch line branched at a downstream point of the first radiator in the battery line, and connected to a downstream point of the second radiator in the electric part line; and
    a fourth branch line branched at a same point as the third branch line in the battery line, and connected to a downstream point of the third radiator in the radiator line,
    wherein the third branch line and the fourth branch line are connected to the battery line through a sixth valve, and
    wherein the plurality of valves includes the sixth valve.

5. The thermal management system for the vehicle according to claim 4,
    wherein in a mode for cooling the battery core and discharging the cooled air into an indoor space of the vehicle,
    the controller is configured to operate the compressor to circulate the refrigerant in a refrigerant line, is configured to control the first valve, the second valve, the fifth valve, and the sixth valve to circulate the coolant so that the second heat exchanger connected to the condenser is selectively heat-exchanged with the first radiator, the second radiator, and the third radiator, and is configured to control the cooling adjusting valve and the third valve to circulate the coolant so that the coolant having passed through the cooling core connected to the evaporator first cools the indoor by passing through the cooling core, flows into the battery core, and then is recovered back to the first heat exchanger.

6. The thermal management system for the vehicle according to claim 4,
wherein in a mode for discharging the cooled air into an indoor space of the vehicle,
the controller is configured to operate the compressor to circulate the refrigerant in a refrigerant line, is configured to control the first valve, the second valve, the fifth valve, and the sixth valve to circulate the coolant so that the second heat exchanger connected to the condenser is heat-exchanged with the first radiator, the second radiator, and the third radiator, and is configured to control the cooling adjusting valve and the third valve to circulate the coolant so that the coolant having passed through the first heat exchanger connected to the evaporator passes through the cooling core and then is recovered back to the first heat exchanger.

7. The thermal management system for the vehicle according to claim 4,
wherein in a mode for cooling the battery core and the electric part core by use of the outside air of the vehicle and discharging the cooled air into an indoor space of the vehicle,
the controller is configured to operate the compressor to circulate the refrigerant in the refrigerant line, is configured to control the fifth valve and the sixth valve so that the coolant does not circulate in the first and second branch lines and the third and fourth branch lines and to circulate the coolant so that the battery core and the first radiator are heat-exchanged therebetween, is configured to control the fourth valve to circulate the coolant so that the electric part core is heat-exchanged with the second radiator, is configured to control first valve and the second valve to circulate the coolant so that the second heat exchanger connected to the condenser is heat-exchanged with the third radiator, and is configured to control the cooling adjusting valve and the third valve to circulate the coolant so that the coolant having passed through the first heat exchanger connected to the evaporator passes through the cooling core and then is recovered back to the first heat exchanger.

8. The thermal management system for the vehicle according to claim 4,
wherein in a mode for cooling the electric part core by use of the outside air of the vehicle, cooling the battery core by use of the refrigerant line, and discharging the cooled air into an indoor space of the vehicle,
the controller is configured to operate the compressor to circulate the refrigerant in the refrigerant line, is configured to control the fifth valve and the sixth valve so that the coolant does not circulate in the first and second branch lines and the third and fourth branch lines and is configured to control the fourth valve to circulate the coolant so that the electric part core is heat-exchanged with the second radiator, is configured to control first valve and the second valve to circulate the coolant so that the second heat exchanger connected to the condenser is heat-exchanged with the third radiator, and is configured to control the cooling adjusting valve and the third valve to circulate the coolant so that the coolant having passed through the first heat exchanger connected to the evaporator passes through the cooling core, first cools the indoor, flows into the battery core, and then is recovered back to the first heat exchanger.

9. The thermal management system for the vehicle according to claim 4, further including
a second bypass line having a first end portion connected to a downstream point of the first heat exchanger in the indoor cooling line through a seventh valve, and having a second end portion connected to the upstream point of the electric part core in the electric part line; and
a third bypass line having a first end portion connected to the downstream point of the second radiator in the electric part line through an eighth valve, and having a second end portion connected to the upstream point of the second radiator in the electric part line,
wherein the plurality of valves includes the seventh valve.

10. The thermal management system for the vehicle according to claim 9,
wherein in a mode for cooling the battery core and the electric part core and discharging the heated air into an indoor space of the vehicle,
the controller is configured to operate the compressor to circulate the refrigerant in the refrigerant line, is configured to control the fifth valve and the sixth valve so that the coolant does not circulate in the first and second branch lines and the third and fourth branch lines, is configured to control the fourth valve and the eighth valve to circulate the coolant so that the coolant having passed through the electric part core is branched to flow into the first bypass line and the second radiator, is configured to control cooling adjusting valve, the third valve and the seventh valve to circulate the coolant so that the coolant having passed through the first heat exchanger connected to the evaporator is branched to flow into the second bypass line and the cooling core and to circulate the coolant so that the battery core is heat-exchanged with the first radiator, and is configured to control heating adjusting valve, the first valve, and the second valve to circulate the coolant so that the coolant having passed through the second heat exchanger connected to the condenser passes through the heating core and then is recovered back to the second heat exchanger.

11. The thermal management system for the vehicle according to claim 9, further including a fourth bypass line having a first end portion connected to a point between the third branch line and the eighth valve in the electric part line, and having a second end portion connected to the fourth valve.

12. The thermal management system for the vehicle according to claim 11,
wherein in a mode for heating the battery core and discharging the heated air into an indoor space of the vehicle,
the controller is configured to operate the compressor to circulate the refrigerant in the refrigerant line, is configured to control the third valve, the fourth valve, the fifth valve, the sixth valve, the seventh valve, and the eighth valve to circulate the coolant so that the first heat exchanger connected to the evaporator is selectively heat-exchanged with the first, second, and third radiators, and is configured to control heating adjusting valve, the first valve, and the third valve to circulate the coolant so that the coolant having passed through the second heat exchanger connected to the condenser is branched to flow into the heating adjusting valve and the battery core and to circulate the coolant so that the coolant having passed through the battery core flows into the heating adjusting valve and then flows into the heating core.

13. The thermal management system for the vehicle according to claim 11,
wherein in a mode for discharging the dehumidified air into an indoor space of the vehicle,
the controller is configured to operate the compressor to circulate the refrigerant in the refrigerant line, is configured to control heating adjusting valve, the first valve, and the second valve to circulate the coolant so that the coolant having passed through the second heat exchanger flows into the heating core, and is configured to control cooling adjusting valve, the third valve, and the seventh valve to circulate the coolant so that the coolant having passed through the first heat exchanger flows into the cooling core.

14. The thermal management system for the vehicle according to claim 11,
wherein in a mode for cooling the electric part core, heating the battery core, and discharging the heated air into an indoor space of the vehicle,
the controller is configured to operate the compressor to circulate the refrigerant in the refrigerant line, is configured to control the third valve, the fourth valve, the fifth valve, the sixth valve, the seventh valve, and the eighth valve to circulate the coolant so that the first heat exchanger and the electric part core are heat-exchanged with the first radiator, the second radiator, and the third radiator, and is configured to control heating adjusting valve, the first valve, and the third valve to circulate the coolant so that the coolant having passed through the second heat exchanger is branched to flow into the heating adjusting valve and the battery core and to circulate the coolant so that the coolant having passed through the battery core flows into the heating adjusting valve and then flows into the heating core.

15. The thermal management system for the vehicle according to claim 11,
wherein in a ninth mode for cooling the electric part core by use of the outside air of the vehicle,
the controller is configured to control the fourth valve and the eighth valve to circulate the coolant so that the electric part core is heat-exchanged with the second radiator.

16. The thermal management system for the vehicle according to claim 11,
wherein in a mode for cooling the battery core by use of the outside air of the vehicle,
the controller is configured to control the fifth valve and the sixth valve to circulate the coolant so that the battery core is heat-exchanged with the first radiator.

17. The thermal management system for the vehicle according to claim 11,
wherein in a mode for cooling the electric part core and the battery core by use of the outside air of the vehicle,
the controller is configured to control fourth valve and the eighth valve to circulate the coolant so that the electric part core is heat-exchanged with the second radiator, and is configured to control the fifth valve and the sixth valve to circulate the coolant so that the battery core is heat-exchanged with the first radiator.

* * * * *